US006328897B1

(12) United States Patent
Leung

(10) Patent No.: US 6,328,897 B1
(45) Date of Patent: Dec. 11, 2001

(54) METHOD AND APPARATUS FOR CONTROLLING VERTICAL AND HORIZONTAL BASKET CENTRIFUGES

(75) Inventor: Wallace Woon-Fong Leung, Sherborn, MA (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/526,567

(22) Filed: Mar. 16, 2000

Related U.S. Application Data

(63) Continuation of application No. 09/090,132, filed on Jun. 3, 1998, now Pat. No. 6,063,292.

(60) Provisional application No. 60/053,117, filed on Jul. 18, 1997.

(51) Int. Cl.[7] .................................................. B01D 17/038

(52) U.S. Cl. ............................ 210/744; 210/85; 210/86; 210/96.1; 210/143; 210/360.1; 210/739; 210/787

(58) Field of Search ................................ 210/85, 86, 87, 210/96.1, 109, 110, 143, 144, 145, 360.1, 374, 378, 512.1, 739, 745, 781, 787, 90, 91, 94, 744; 494/1, 7, 8, 10, 37, 50–54, 84; 364/528.08; 700/273

(56) References Cited

U.S. PATENT DOCUMENTS

| | | | |
|---|---|---|---|
| 3,712,471 | 1/1973 | Muller | 210/86 |
| 4,070,290 * | 1/1978 | Crosby | 210/144 |
| 4,900,453 | 2/1990 | Sedlmayer | 210/86 |
| 5,004,540 | 4/1991 | Hendricks | 210/380.1 |
| 5,254,241 | 10/1993 | Bange et al. | 210/86 |
| 5,582,742 | 12/1996 | Wilkie et al. | 210/781 |
| 5,695,442 | 12/1997 | Leung et al. | 210/86 |
| 5,897,786 | 4/1999 | Henkel et al. | 210/86 |
| 5,900,156 | 5/1999 | Ziegler | 210/86 |
| 5,904,840 | 5/1999 | Dibella | 494/10 |
| 5,948,217 | 9/1999 | Wardwell et al. | 210/745 |

FOREIGN PATENT DOCUMENTS

| | | |
|---|---|---|
| 36 15 013 C | 6/1987 | (DE) . |
| 40 04 584 A | 1/1992 | (DE) . |
| 0 679 722A | 11/1995 | (EP) . |
| WO 97 20634 A | 6/1997 | (WO) . |

OTHER PUBLICATIONS

Patent Abstracts of Japan; vol. 12, No. 50 (C–476, Feb. 16, 1988 and JP 62 197169 (Nippon Steel Corp.) Aug. 31, 1987.

Patent Abstracts of Japan vol. 16, No. 144 (C–0927), Apr. 10, 1992 and JP 04004058 A (Mitsubishi Kakoki Kaisha Ltd.) Jan. 8, 1992.

* cited by examiner

*Primary Examiner*—Joseph W. Drodge
(74) *Attorney, Agent, or Firm*—Cantor Colburn LLP

(57) ABSTRACT

A computerized system for monitoring, and controlling various parameters and processes of basket centrifuges is presented. The computer control system actuates at least one of a plurality of control devices based on input from one or more monitoring sensors so as to provide real time, continuous, operational control of parameters related to feeding, filtering, washing, and dewatering.

34 Claims, 13 Drawing Sheets

METHOD AND APPARATUS FOR CONTROLLING VERTICAL AND HORIZONTAL BASKET CENTRIFUGES

CROSS-REFERENCE TO RELATED APPLICATIONS

This application claims priority under 35 USC §119 from Provisional Application Ser. No. 60/053,117, filed Jul. 18, 1997 and is a continuation of application Ser. No. 09/090,132 filed Jun. 3, 1998, now U.S. Pat. No. 6,063,292.

BACKGROUND OF THE INVENTION

1. Field of the Invention

This invention relates generally to basket centrifuges. More particularly, this invention relates to methods and apparatus for automatically monitoring, operating, and controlling basket centrifuges using intelligent computer control systems and remote sensing devices. This invention is particularly useful for the monitoring and controlling of parameters such as feeding, cake moisture, filtration resistance (including that due to the cake, cake heel and filter media), solids volume fraction or cake porosity, wash ratio, and optimal G-force and time for the entire operating cycle.

2. Description of the Related Art

A centrifuge is a machine that uses centrifugal force for separating substances according to the difference in their physical properties. A sedimenting solid-wall centrifuge, for example, separates liquids and solids of different densities contained in a slurry mixture; a filtering "perforate-wall" centrifuge separates solids from liquids whereby the solids are retained by a filter media and the liquid is allowed to pass through. Such perforate wall centrifuges are also commonly known as "basket filtering centrifuges" or simply "basket centrifuges". Centrifugal gravity G, in units of earth's gravity g (32.2 ft/s$^2$ or 9.8 m/s$^2$), for basket filtering centrifuges ranges typically from 300 g to 2000 g. Examples of various basket (i.e., filtering-type batch, or perforate wall) centrifuges are disclosed in commonly assigned U.S. Pat. Nos. 5,582,742 to Wilkie et al., and 5,004,540 to Hendricks. As used herein, "basket centrifuge" refers generally to all types of perforate wall, batch filtering centrifuges, including those having solid-bottom (both base-bearing and link-suspended) and open bottom (both top-suspended and link-suspended), and top driven or bottom driven baskets.

In a basket centrifuge a feed slurry is introduced into a filtering basket rotating at a high angular velocity. After the contents have accelerated to speed, the centrifugal force results in separation of the liquid components of the slurry from the solid components, in that the liquid components (the filtrate) are forced through a filter medium supported by the perforated wall of the filtering basket while the solid components are retained on the filtering medium. The solid components remaining in the filtering basket are referred to as a cake.

With reference to FIG. IA, one cycle for batch filtering centrifuges comprises acceleration of the basket to intermediate (loading) speed, typically 40%–60% of full speed; loading, that is, introduction of the feed or input stream into the basket; acceleration to full speed; washing of the filter cake; drying of the filter cake; deceleration; and discharge or unloading of the filter cake. In certain cases, the wash liquid is introduced immediately after feeding before the basket is accelerated to full speed. Cycle time generally varies from several minutes to half an hour. In some pharmaceutical and specialty chemical processes, the cycle time can be as long as several hours due to the slow drainage or dewatering of liquid from the cake, in which cases the throughput is significantly reduced.

Acceleration and deceleration times depend on the moment of inertia of the basket and its total contents, and driving and braking torques. Wash times vary based on the mass of the cake, the wash ratio (the amount of wash liquid vs. the amount of residual mother liquor which it is displacing), the impurity level, and the cake resistance/permeability.

Feeding times, typically several minutes, depend on the filtration rate, which in turn depends on the cake thickness and permeability. The filtration flux is generally between 0.5 and 2 gpm per square foot of filter medium. For slow-filtering materials with low cake permeability (high cake resistance) feeding is in batches (or intermittent) to allow the filtration to "catch-up". Otherwise, the feed slurry might overflow the end weir. Dewatering times are a function of operating conditions (G and cake height) and cake properties (final cake moisture, permeability and liquid viscosity), while unloading times depend on the amount of the filter cake and its rheology. Each of the above steps may be initiated manually by an operator, or semi-automatically using programmed steps in conjunction with reset timers, speed sensors, limit switches, and the like. Usually feeding time (filtration limited) and/or dewatering time (dewatering limited) dictate the length of the cycle.

Controlling and optimizing the operation of such centrifuges is a difficult task considering the high rotational speeds of the basket, and the changing characteristics of the input or feed slurry due to upstream "upset" from crystallizer or reactor, and the filtrate and cake outputs. Also, a basket centrifuge is typically used to process different products at various times, and depending on their characteristics the products have different filtration and dewatering requirements. For some plants, the operators have been instructed to run different cycle times for various products based on the histories of each product. Some require a cycle time of only half an hour, while others can take up to eight hours. In some pharmaceutical applications, given the high value of the product, an operator needs to monitor the centrifuge until the last drop of filtrate drains out of the basket. This manual attendance becomes a time-consuming nuisance. A limited practice for control has been adopted based on products with various cycle times from past experience. Given the variability of the feed, especially due to upsets from upstream crystallizers and reactors as mentioned above, the product may not achieve the final cake dryness based on a nominal dewatering time. In these cases, the operator has to monitor and fine-tune the process for each product, which often varies from batch to batch. Otherwise the operator has to use the most conservative (worst)case when the cycle time is the longest. This unnecessarily reduces the overall throughput to the centrifuge.

However, none of the prior art is apparently directed to comprehensive, computerized control systems for operating, controlling, and monitoring basket centrifuges where manual attendance is eliminated and where the basket centrifuge is constantly optimized. The ability to provide precise, real-time control and monitoring of such centrifuges constitutes an on-going and critical industrial need, especially so that the upset or off-optimum products from the centrifuge, such as wetter cake, are not passed to the downstream dryer or recrystallizer.

SUMMARY OF THE INVENTION

The above-discussed and other drawbacks and deficiencies of the prior art are overcome or alleviated by the several methods and apparatus of the present invention for providing computerized systems for operating, controlling, monitoring, and diagnosing various processes parameters of basket centrifuges. Preferably, the computerized system is an "intelligent" system, which is made up of computerized control methods. These include but are not limited to neural networks, genetic algorithms, fuzzy logic, expert systems, statistical analysis, signal processing, pattern recognition, categorical analysis, or a combination thereof, which are used to analyze input variables in terms of one or more self-generated, continuously updated, internal models, and to make changes in operating variables as suggested by those models. An intelligent basket centrifuge of the type disclosed herein has the capability of providing information about itself, predicting its own future state, adapting and changing over time as feed and machine conditions change, knowing about its own performance and changing its mode of operation to improve its performance. Specifically, the control system of the present invention regularly receives instrument readings, digitized video images, or other data indicating the state of the centrifuge; analyzes these readings in terms of one or more self-generated, continuously updated, internal models; and makes changes in operating variables as suggested by the internal models.

In one embodiment, the present invention comprises a basket centrifuge, either substantially horizontally or vertically mounted, at least one sensor, at least one control device, and a computer-based control system which actuates at least one control device based on input from the at least one sensor, whereby at least one operating parameter of the centrifuge is sensed and controlled by the computer-based control system. The sensing and control feedback allows the basket to operate continuously at or near optimal performance.

The at least one sensor may sense process and other parameters, including machine operation parameters and parameters related to the input and output streams of the centrifuge. Examples of parameters sensed in real time include, but are not limited to, acoustic emissions, vibration, bearing temperature, torque; amperage (power draw), rotation speed of the basket, position of internal members such as the feed inlet and the cake plow, and duration for each segment of the cycle (feeding, washing, dewatering, acceleration and deceleration); the bulk density, solids concentration, and contaminant level of each of the feed, filtrate and cake (nine variables total), the mass or volumetric feed rate, the temperature of the feed, the solids concentration from the feed overflow, the weight of the basket content with time, the temperature of the contents within the basket, the cake height distribution circumferentially and axially with time, the cake liquid saturation, the solids volume fraction (which is the complement of cake void fraction or porosity) as a function of time, the actual internal solid/liquid separation taking place with cake formation, the height of the pool, the strain on the hoops of the basket, and the hydrostatic pressure on the face of the end walls (cover lid and bottom of the basket) along the radial direction, which is perpendicular to the axis of basket rotation.

Preferably, the sensor or sensors comprise mass and volumetric flowmeters, density meters, pressure transducers, load cells, capacitor measurement devices such as proximity gauges and conductivity probes, ultrasonic sensors, temperature sensors, millimeter-wave length radar, infra-red beam transmitter and sensors, laser spectroscopy, strain gauges, and vibration sensors.

Video cameras are also used to measure surface and interface location of the pool liquid and cake. When mounted in a stationary frame, the image represents an average of the measurement around the circumference fo the basket. The camera can also be mounted on a rotating frame which rotates at the same angular speed as the basket. If driven by a separate motor and transmission, local measurement at a specific angular position can be made when the camera is reoriented at several angular positions, taking respective readings. An average of all the readings yields an average of the circumference.

In another embodiment, the filtrate solids are monitored by a streaming current detector, density meter or turbidity meter to indicate torn, worn, or too open filter medium, allowing fine solids to pass through.

In a particularly preferred embodiment, the apparatus comprises a basket centrifuge with at least one sensor for providing inputs or input variables consisting of feed rates; weight fraction of solids respectively in the feed, filtrate, and cake; pool depth; cake height; mass of the basket contents; feed, filtrate, and cake contaminants; torque; pressure in the liquid pool and cake; amperage(power draw). All of these measurements may be analyzed to provide information regarding average cake moisture at a given time; projected time to achieve a desired or set cake moisture; the conditions required to achieve a set cake moisture; optimal throughput; projected schedule to remove the cake heel due to excessive pressure drop from cake heel glazing or blinding of the filter media; optimal temperatures of the feed and wash; and projected schedule to carry-out a clean-in-place (CIP) on both the exterior and interior of the basket especially for food and pharmaceutical applications. As a result of the analysis, at least one output may be generated to activate a control device that effects changes in feed rates, feed solids concentration, amount of wash, speed and duration of each segment in the cycle, total cycle time, temperature, torque, amperage, power consumption, cake height, process temperature, and basket cleaning procedure and operating schedule.

Based on one or more of these approaches and the examples described in detail below, the controller may activate one or more control devices to control at least one process control variable including, but not limited to, feed solids concentration by dilution; feed and wash rate and time sequence, basket speed (thus G-force) and time duration respectively for acceleration, feeding, washing, dewatering or drying, deceleration, cake unloading, and filter medium cleaning; cake height; and CIP procedure.

The above-described computerized control and monitoring system for basket centrifuges provides a comprehensive scheme for monitoring and controlling a variety of input and output parameters as well as a plurality of operational parameters resulting in greater efficiency, optimization of operation, and increased safety. Other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIGS. 3A–3E pertains to initial feeding and filtration while FIGS. 3F–3J pertains to the basket behavior while undergoing final filtration and desaturation.

DETAILED DESCRIPTION OF THE INVENTION

This invention relates to methods and apparatus for automatically controlling, operating, and monitoring basket centrifuges using computer control systems. Although various embodiments of this invention may be described in relation to a basket centrifuge rotatable about its vertical axis, it is understood that it is equally applicable to a basket centrifuge rotatable about its horizontal axis.

In a first embodiment, this invention comprises a horizontal or vertical basket centrifuge, at least one sensor, at least one control device, and a computer-based control system which actuates the at least one control device based on input from the at least one sensor, whereby at least one parameter of the centrifuge is sensed and controlled by the computer-based control system. The computer-based control system may be either a computer or a computer-type control processing unit (CPU) in conjunction with a programmable logic control (PLC). The sensing and control feedback allows the basket centrifuge to operate at or near optimal performance.

Figure 1:
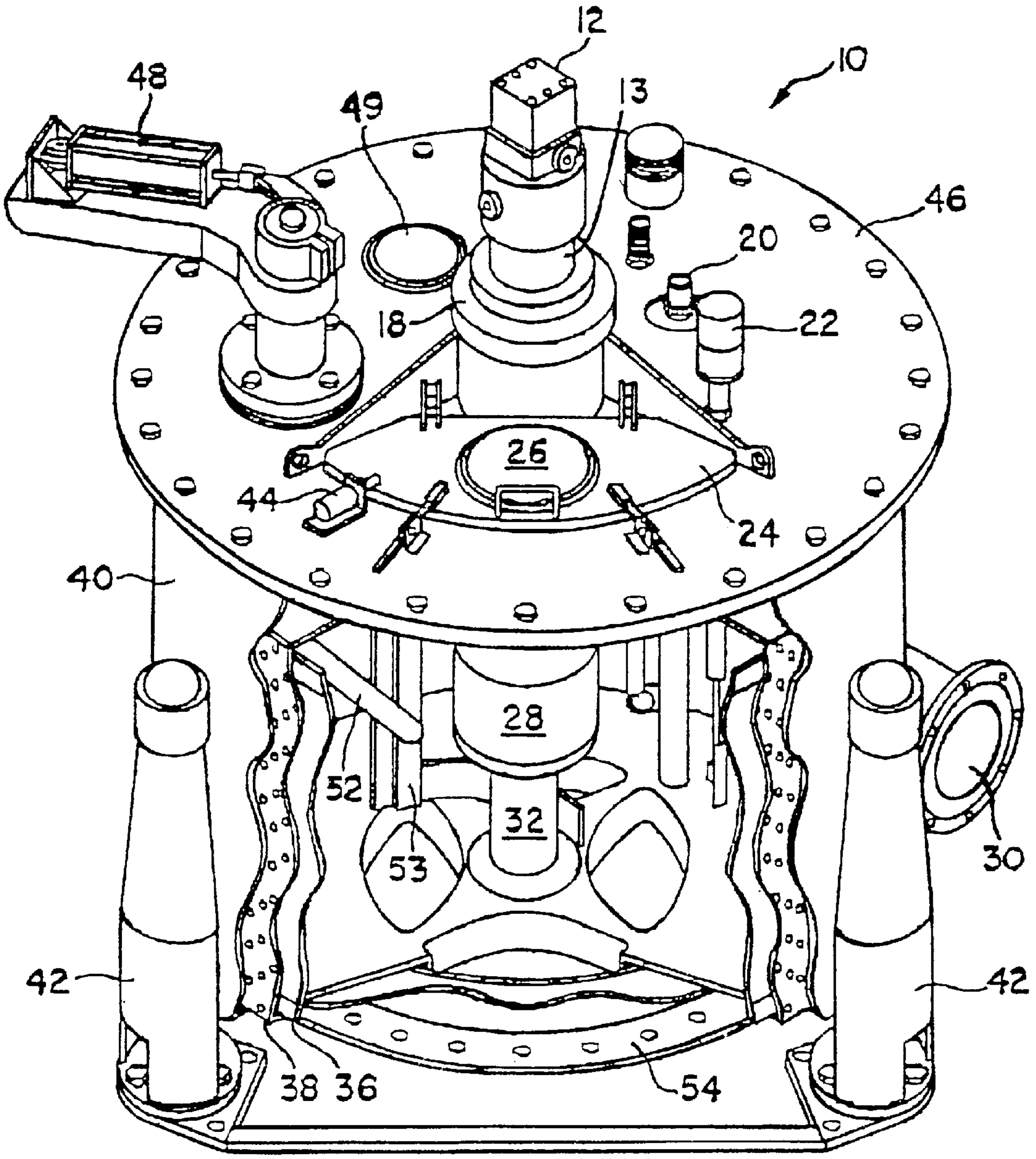
FIG. 1 (PRIOR ART)
FIG. 1 is a schematic drawing of a typical prior art basket centrifuge showing top drive and bottom cake discharge.
Figure 1A:
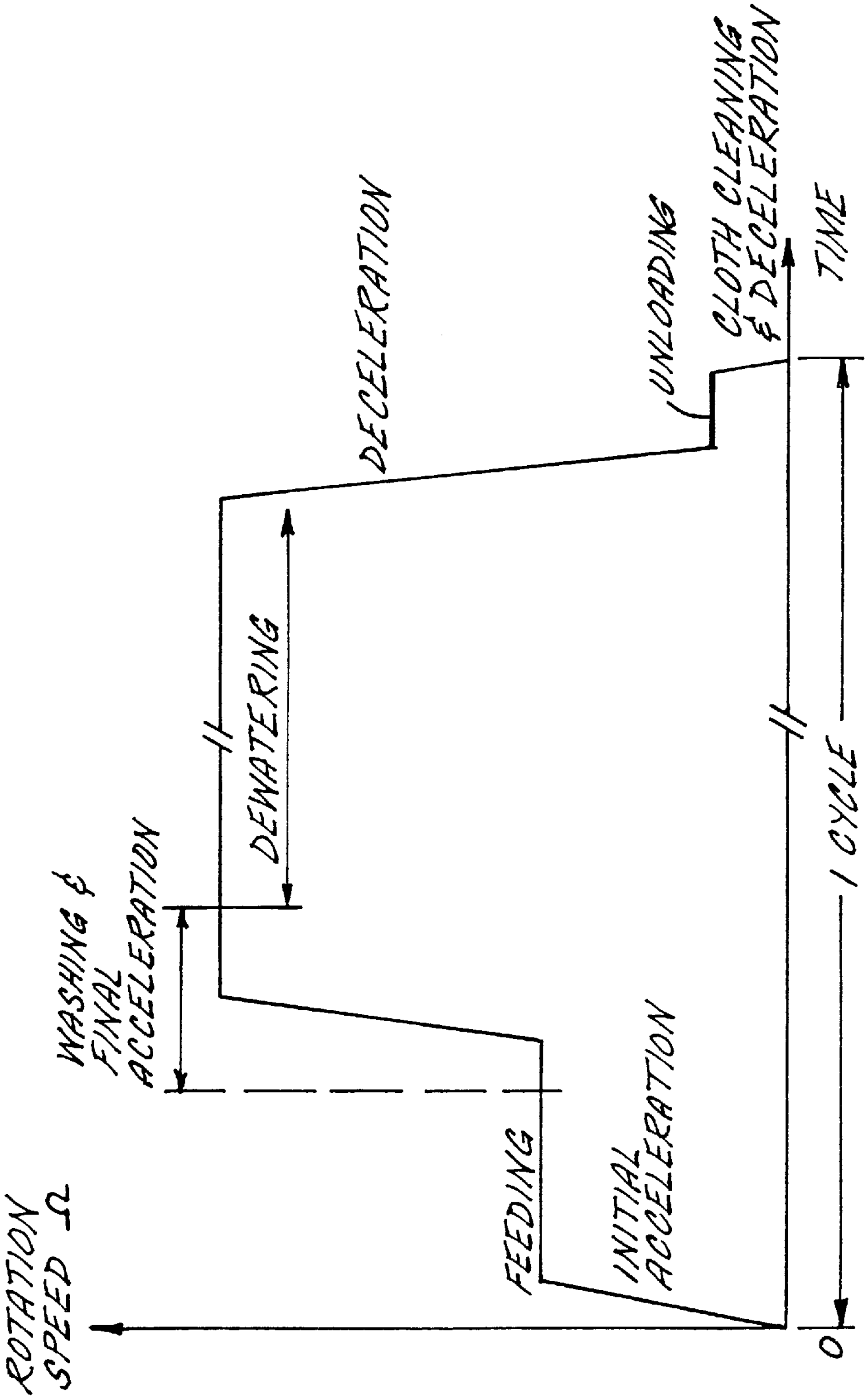
FIG. 1A (PRIOR ART)
FIG. 1A is a schematic of the basket rotational speed at different process segments of the cycle. The respective speed and duration for each segment can be changed.

FIG. 1 shows a typical filtering-type basket centrifugal extractor 10 employing batch baskets, available from Bird/Ketema of South Walpole, Mass. These types of centrifuges are suitable for dewatering of slurry which is filterable and drainable. Accordingly, centrifugal extractor or centrifuge 10 includes a hydraulic or electric motor 12 that turns shaft 13 housed in greased bearing housing 28. Turning shaft 13 spins perforated basket 38 and its accompanying filter medium 36 at a speed that is matched to the basket's diameter and its depth to yield a desired cake thickness. RPM probe 18 is employed to monitor and control the rotational speed of the basket. In this example case, the centrifugal force obtained by the rotation of the basket is about 800 g's. In other words, the force that pushes the slurry mixture outward toward the filtering basket is about 800 times that of the gravitational pull, with 1 g acceleration being 32.2 ft/s$^2$ or 9.8 m/s$^2$.

For clarity, the stationary housing 40 is shown with part of its covering material removed. Feed pipe 20 is used to feed a slurry mixture into the filtering basket of the centrifuge. The solid cake is collected on filter media 36 and the liquid component is passed out of the centrifuge through liquid outlet 30. Once a sufficient thickness of cake is achieved, hydraulic unloader 48 is used to remove solids in a single plowing motion. The unloader is equipped with support arm 52 to guide the plow 53 uniformly into the cake. The plow swings from a retracted position in the center of the basket to its operating position while the basket 38 rotates at low speed. This action cuts and deflects the cake through the bottom discharge 54. When retracted, it can neither interfere nor come into contact with the solids load in the basket. The cake heel is the remaining cake left on the filter medium after the main body of the cake is scraped off. This cake heel often becomes glazed as a result of the plow 53 further compacting this layer over several cycles of operation. The plow 53 is typically configured with a safety feature that prevents operation above a safe basket speed. If such a safe speed is exceeded the plow 53 is automatically returned to its retracted position.

If the cake is not distributed generally evenly across the entire surface area of basket 38 including filter medium 36, then the cake may not be properly washed as wash liquid tends to channel towards areas with smaller cake height. Further, if the cake is not distributed evenly, then centrifuge assembly 10 will become unbalanced, much like the familiar imbalancing of a washing machine when a laundry load has become unevenly distributed inside the washing basket. Load detector 22 senses the uneven load and can close a feed valve (not shown) to shut off flow to feed pipe 20. Such an imbalance is highly undesirable because it disturbs the continuous operation of the centrifuge and might result in severe mechanical vibration during operation.

Case 40 further includes removable case cover 46 to allow operator access into the main body of the centrifuge where the filtering basket is housed. Cover inter-lock 44 holds in place hinge cover 24, which is used to access the centrifuge parts for maintenance purposes such as changing or cleaning the filter medium. Sight glass 26 allows an operator to view operation of the centrifuge without stopping its operation. Glass port 49 may serve a purpose similar to sight glass 26, and additionally a light may be mounted above this port to aid maintenance or troubleshooting operations. A tapered spindle 32 is key-locked and facilitates basket removal and machine maintenance. The centrifuge unit is mounted on a common base having shock absorbers housed within link stands 42 to minimize vibration transmitted to the foundation on which the unit is mounted, which vibration results from unbalanced loads caused by an uneven distribution of the slurry within the basket. The center of gravity of the centrifuge is typically below the elevation where the linkages are connected to the centrifuge to gain mechanical stability.

In accordance with the present invention, basket centrifuges of the type discussed above are provided with one or more sensors for the sensing of one or more parameters related to the operation of the centrifuge, and one or more control devices for controlling one or more parameters related to the operation of the centrifuge. A computerized control system is further provided, which may be located at the centrifuge, near the centrifuge, or at a remote location for the centrifuge. The computerized control system may be a computer or a computer-type, central processing unit (CPU) in conjunction with a programmable logic control (PLC). The sensing and control feedback allows the centrifuge to operate at or near optimal performance.

In one embodiment, this invention relates to providing computerized ("intelligent") systems for operating, controlling, monitoring, and diagnosing various processes parameters of basket centrifuges. By "intelligent" is meant that the computer uses computerized control methods, including but not limited to neural networks, genetic algorithms, fuzzy logic, expert systems, statistical analysis, signal processing, pattern recognition, categorical analysis, or a combination thereof, to analyze input in terms of one or more self-generated, continuously updated, internal models, and to make changes in operating variables as suggested by those models. An intelligent basket centrifuge of the type disclosed herein has the capability of providing information about itself, predicting its own future state, adapting and changing over time as feed and machine conditions change, knowing about its own performance and changing its mode of operation to improve its performance. Such computerized control systems have been described for continuous-feed centrifuges in pending U.S. application Ser. No. 08/756,713, filed Nov. 26, 1996, now U.S. Pat. No. 5,948,271 the disclosure of which is hereby incorporated by reference in its entirety. While controller 126 may operate using any one or more of a plurality of advanced computerized control methods, it is also contemplated that these methods may be combined with one or more of the prior art methods, including feed forward or feedback control loops, such as with proportional, integral proportional, or differential controls.

Figure 2A:
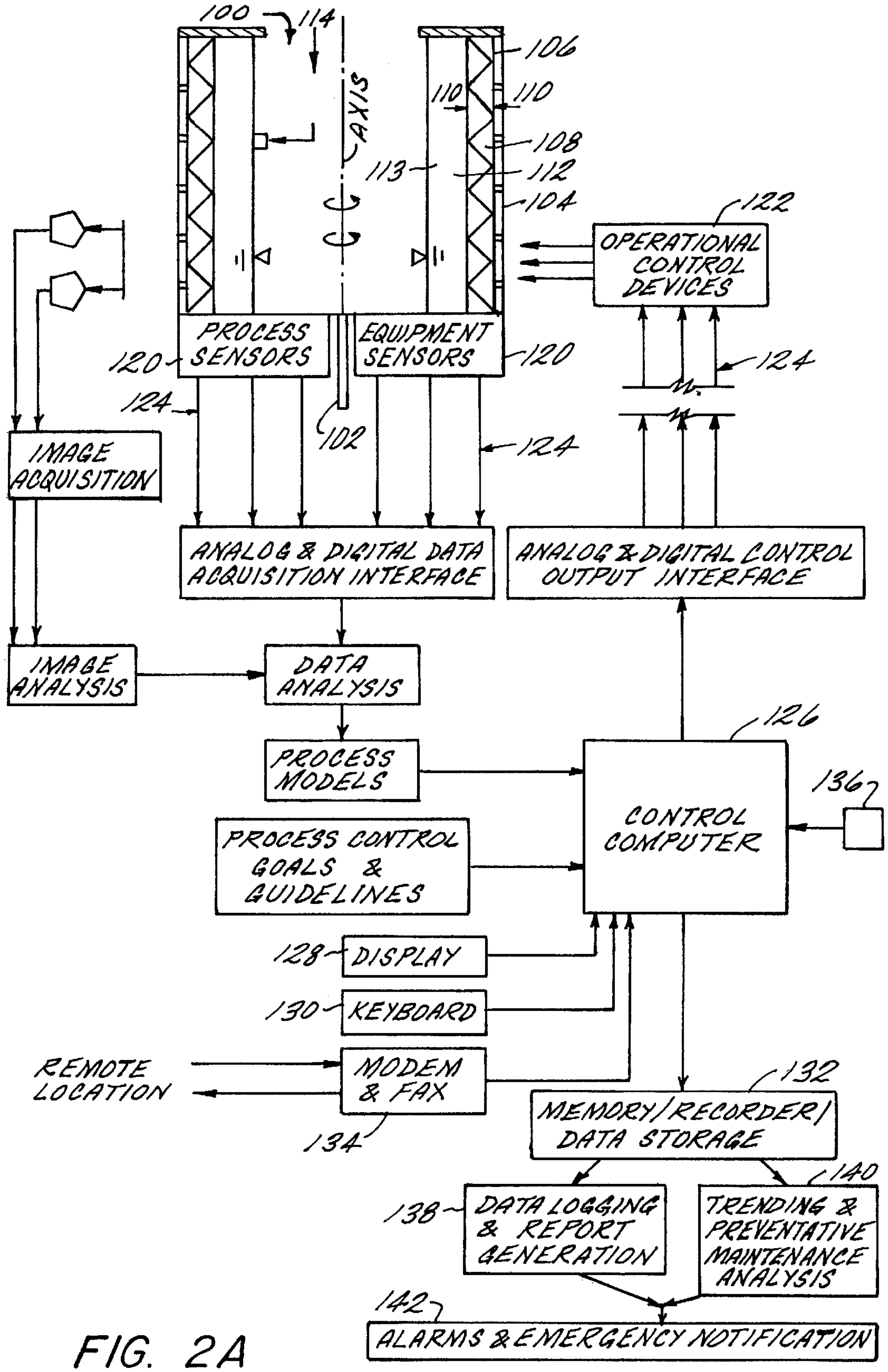
FIG. 2A is a schematic diagram showing the sensing and control system for basket centrifuges in accordance with the present invention.

FIG. 2A shows a schematic diagram of a vertical basket centrifuge generally illustrating examples of the monitoring sensors, control devices and computerized control system in accordance with the present invention. A similar arrangement may be used with a horizontal basket centrifuge. FIG. 2A more particularly shows centrifuge 100 having a shaft 102 for rotation, a basket 104 and screen or filter media 106 for collecting the cake 108. The cake height is shown at 110, the pool at 112, the pool height at 113, and the entry for feed and wash at 114.

In addition, centrifuge 100 is associated with one or more sensors 120 and with one or more operational control devices 122. Both the sensors 120 and the control devices 122 communicate through a suitable communications system 124 with computer controller 126. Suitable communications systems include those known in the art, such as wiring, radio frequency methods, slip rings, and the like. Controller 126 has associated therewith a display 128 for displaying data and other parameters, and a keyboard 130 for inputting control signals, data and the like. Optionally, controller 126 has a memory or recorder 132 and a modem 134 for inputting and outputting data to the controller 126 from a remote location. One or more power sources 136 provides power to controller 126 as well as the internal and external sensors and control devices.

Still referring to FIG. 2A, the microprocessor controller 126 receives a variety of inputs which have been categorized generally in terms of (1) information stored in memory when the centrifuge is manufactured and shipped; (2) information stored in memory since the centrifuge is in operation; (3) information programmed at the site where the centrifuge is to be used; (4) operating parameters sensed by sensors 120; and (5) process parameters sensed by the sensors 120. Examples of information originally stored in memory include information relating to the operation and maintenance of the centrifuge and training information, all of which will be readily available to an operator on video screen 128 associated with controller 126. Examples of information programmed at the site where the centrifuge is to be used includes the operating parameter ranges, output parameters, desired feed properties, and other site-specific data such as ambient, temperature, relative humidity and other environmental factors.

Still referring to FIG. 2A, the outputs from the microprocessor controller may be generally categorized as (1) data stored in memory 132 associated with the controller 126, (2) operational control of the centrifuge and (3) real time information provided to the operator at the monitor 128 associated with the microprocessor 126. Referring more particularly to the data stored in memory, it will be appreciated that the computerized monitoring and control system of this invention may utilize the aforementioned sensors to monitor various parameters with respect to time and thereby provide a detailed historical record of the centrifuge operation. This record may be used by the microprocessor to model centrifuge operation, adjust models for centrifuge operation or generally learn how the centrifuge behaves in response to changes in various inputs. This record may also be used to provide a data log 138, provide preventative maintenance information 140, predict failure and predict machine wear 142 and filter cloth change. Examples of information originally stored in memory include information relating to the operation and maintenance of the centrifuge and operator training information, all of which will be readily available to an operator on display screen 128 associated with microprocessor controller 126. Operational control of the centrifuge will be described in more detail below.

In an important feature of the present invention, a number of sensors 120 are disclosed that sense a variety of aspects related to the centrifuge, its operations, and its input and output (filtrate and cake) streams. The information or parameters sensed and/or measured by these sensors include operating parameters, and input and output stream parameters. Examples of the operating parameters include acoustic emissions, vibration, bearing temperature, torque, amperage, rotational speed of the basket (G-level), position of internal members such as the feed inlet and the cake plow, and duration for each segment of the cycle (feeding, washing, dewatering, acceleration and deceleration).

Examples of parameters relating to the input and output streams include the bulk density, solids concentration, and contaminant level of each of the feed, filtrate and cake (nine variables total); the mass or volumetric feed rate; temperature of feed; the solids concentration in the feed overflow; the weight of the basket content over time; the temperature of the contents within the basket; the cake height distribution circumferentially and axially with time; the cake liquid saturation; the solids volume fraction (which is the complement of cake void fraction or porosity) as a function of time; the actual internal solid/liquid separation taking place with cake formation; the height of the pool; and the hydrostatic pressure on the face of the end walls (cover lid and bottom of the basket) along the radial direction. The aforementioned centrifuge parameters sensed using the control system of the present invention will be more fully explained in detail hereinafter with regard to the several examples.

Preferably, the sensor or sensors comprise mass and volumetric flowmeters, density meters to measure the percent weight fraction of solids, capacitor measurement devices such as proximity gauges and conductivity probes, ultrasonic sensors and the like to measure pool level, temperature sensors, millimeter-wave length radar to monitor cake thickness submerged in the pool of liquid, in-situ infra-red beam reflectional absorbance to monitor cake moisture, and vibration sensors to measure the displacement, velocity, and acceleration of centrifuge vibration in appropriate areas.

Of course, an important feature of this invention is that in response to the many parameters sensed by the sensors 120 associated with the centrifuge 100, the operation of the centrifuge and thereby its ultimate efficiency and functioning can be adjusted, changed and preferably optimized. For example, when the drop in pressure (Δp) across the medium and cake heel becomes excessive, a thorough clean-up is required to remove the cake heel by back-blowing, using an air jet from the scraper knife or back-wash. Also, if the cake heel has been removed and the resistance at the medium is still very high, blinding of the medium is indicated, and cleaning or replacing the medium is in order.

Based on the sensor input to the microprocessor 126, the microprocessor may actuate a number of control devices 122 to control a number of parameters including, for example, adjustments to the speed of rotation, the flow rate and temperature of the input stream, the flow rate and temperature of the wash liquid, the pool heights, and the concentration of solids/liquids in the input stream. In some cases, the control devices will be actuated if certain sensed parameters are outside the normal or predetermined centrifuge operating range. This operating range may be programmed into the control system either prior to or during operation. The foregoing operational controls and examples of actual control devices that will provide such operational controls will be described in more detail hereinafter.

Referring still to FIG. 2A, other outputs include the real time status of various parameters at the centrifuge. Thus, the operator may use the computerized control and monitoring system of the present invention to diagnose the present condition of the equipment, order spare parts including using a modem/fax 134, obtain a read-out of operating parameters, and also as part of an overall Supervisory Control and Data Acquisition (SCADA) system. Suitable techniques for communicating among the sensors, microprocessor, and other components include hard-wired electrical systems, optical systems, RF systems, infra-red systems, acoustic systems, video systems, and ultrasonic systems. Pressure sensitive paint may also be used in conjunction with video imaging- For measurement devices attached to the rotating basket, such as pressure transducers embedded at the inner surface of the end rings, the signals from a rotating unit are transmitted to the stationary laboratory reference frame through mercury slip rings.

Figure 2B:
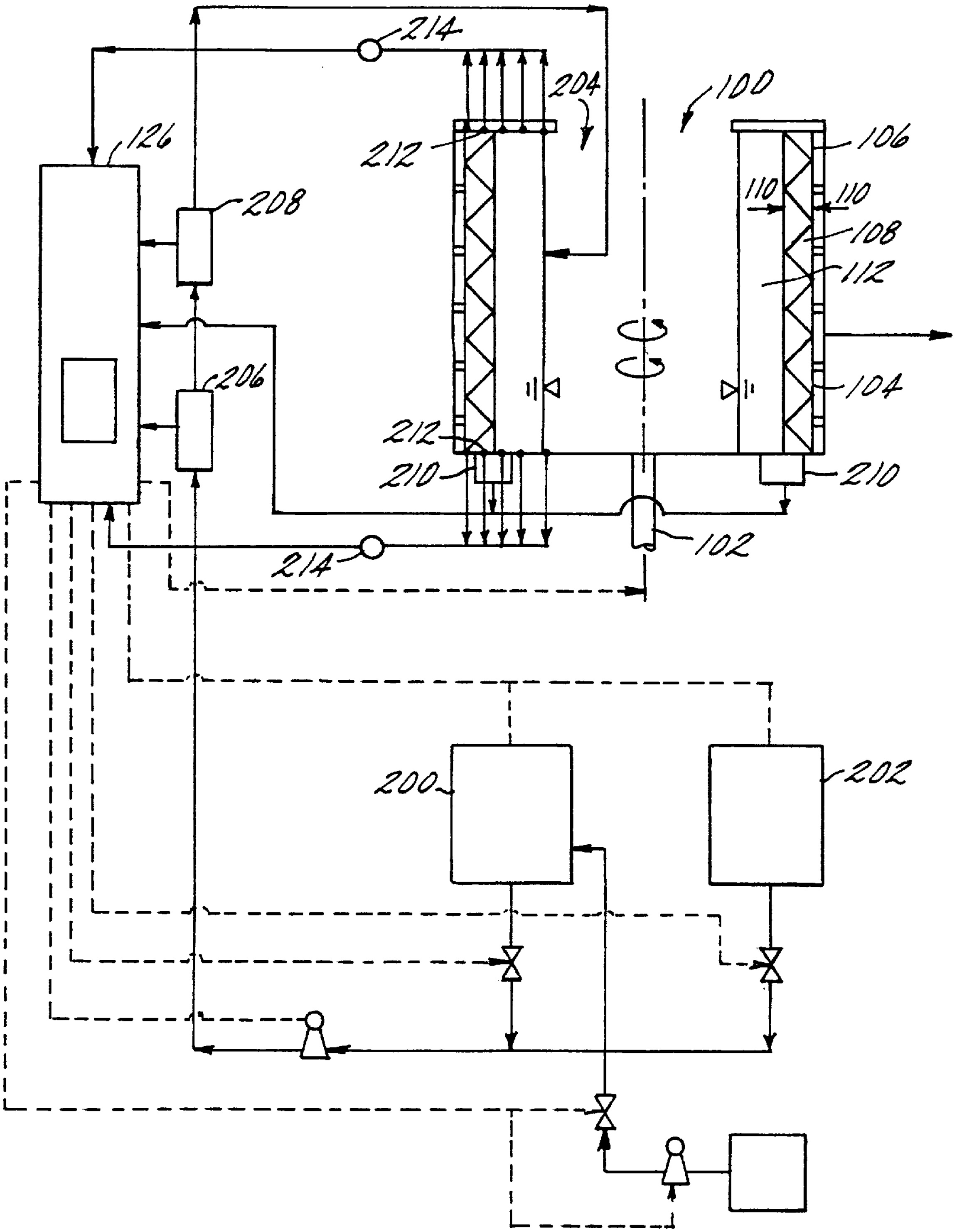
FIG. 2B is a schematic diagram showing a preferred embodiment of the sensing and control system for basket centrifuges in accordance with the present invention.

More specifically, referring to FIG. 2B, a schematic diagram of a vertical basket centrifuge 100 is shown having basket 104, with cake 108 and pool 112. Feed from reservoir 200 and wash from reservoir 202 enter at 204. The feed and wash input streams into the basket are routed first through flow rate meters 206. Flow rate meters 206 may measure flow rate either volumetrically or by mass. The feed and wash input streams may also be routed through density meters 208 to measure density and solids concentration, i.e., the weight fraction of solid in the slurry. These analog outputs are communicated to an extraneous analog/digital converter where the signals in digital form are stored and manipulated in the CPU 126. Also shown in FIG. 2B is an arrangement of pressure transducers 212 and slip rings 214 which may be used to conduct signals from the rotating basket to the stationary frame.

Figure 2C:
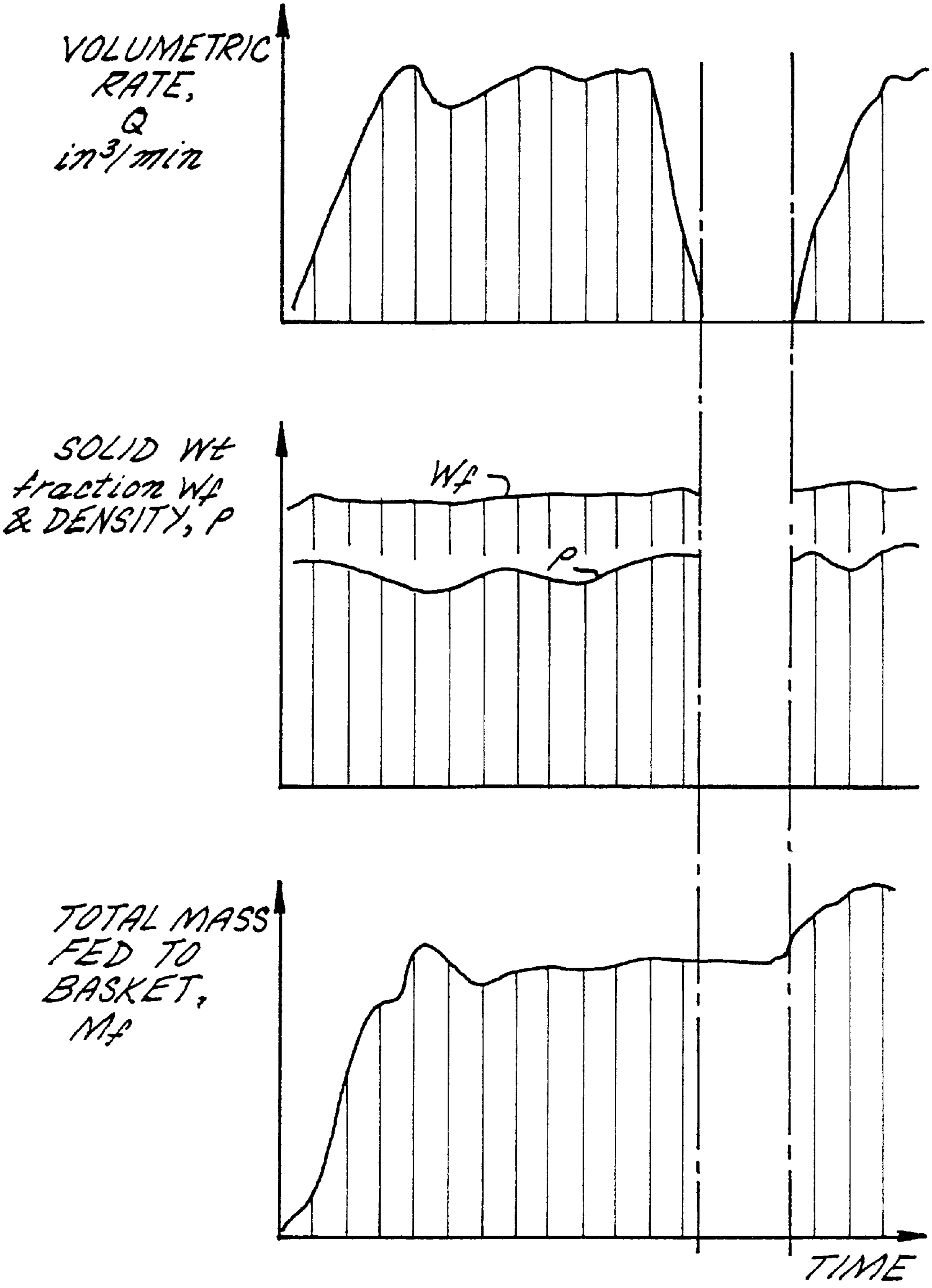
FIG. 2C shows a schematic of the measurements of total volumetric rate of slurry (solid +liquid) Q, and density of slurry ρ from which the solid weight fraction $W_f$ can be deduced. The total solids mass (dry basis) can be obtained by integrating in time the product of Q, ρ and $W_f$. This is carried out in the "data analysis block" shown in FIG. 2A.

FIG. 2C shows measurement of the mass/volumetric rate and the percent solids or density, both of which are used in the digital processing unit to determine the cumulative solids mass input to the machine. Another embodiment in accordance with the present invention utilizes dilution of the feed to control the feed solids fraction as measured by density meter. This allows the maximum solids throughput without running into mechanical vibration due to mal-distribution of concentrated feed solids to the basket causing imbalance.

Figure 2D:
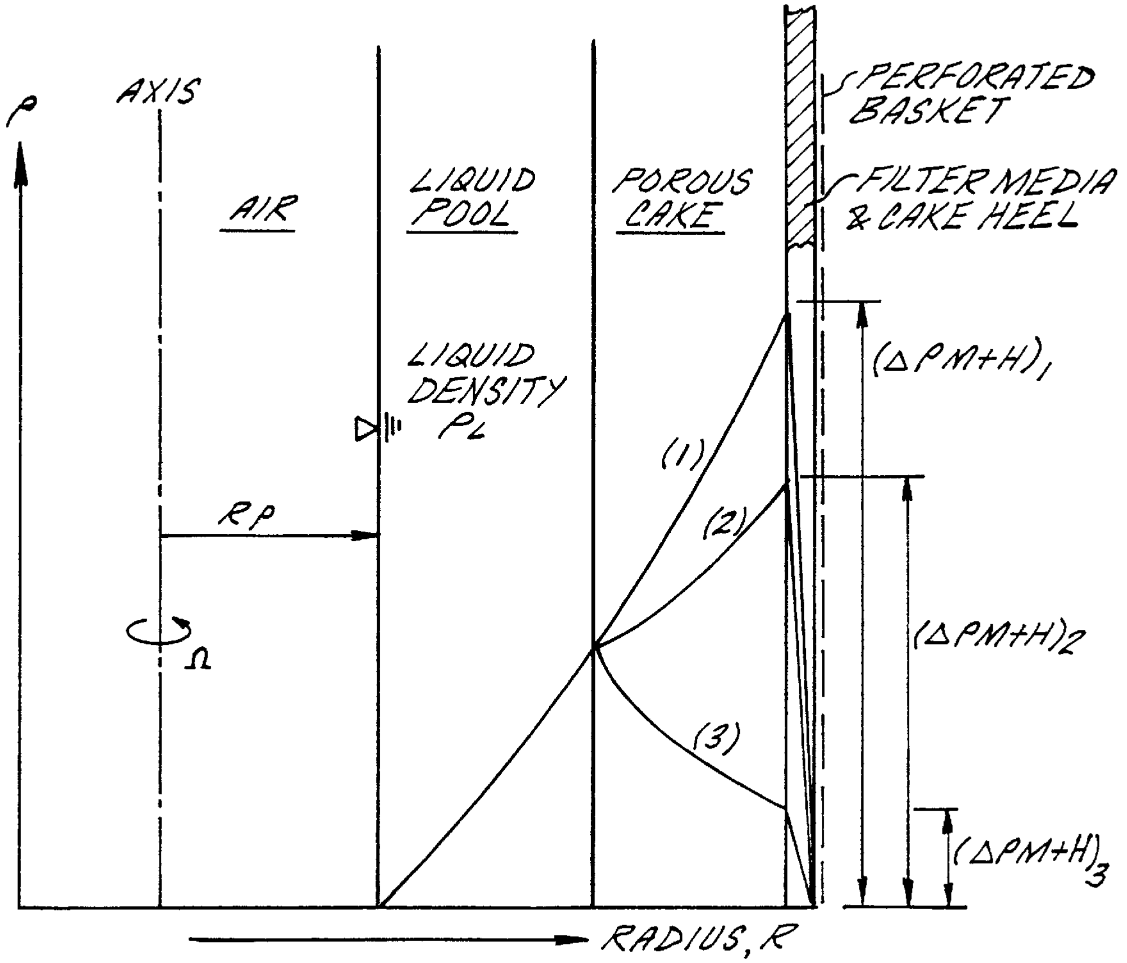
FIG. 2D shows a typical pressure signature from transducer measurement, wherein case 1 represents no filtration due to extremely high filter media and cake heel resistance; case 2 represents a low filtration rate due to high media and heel resistance; and case 3 represents an optimal filtration rate with low media and cake heel resistance.

FIG. 2D shows the pressure signature of a cake submerged in the pool. The change in pressure between the pool and the cake (Δp) can be directly measured. In a particularly preferred embodiment, the liquid pressure in the basket is measured by transducers mounted at the inner surfaces of the basket end weirs along the radial direction. The pressure signal from the transducers mounted in the rotary basket is transmitted to cables in the stationary frame through a "slip ring" arrangement. The pressure profile generated by these data depicts the pool-cake interface, and further determines the pressure drop across the cake, the filter medium, and the cake heel. The latter provides an indication of blinding of medium and any significant degree of cake heel resistance. Useful diagnosis can therefore be obtained if this pressure drop becomes excessive, thereby undermining filtration, in which case cleaning or filter medium replacement is in order.

Figure 3A:
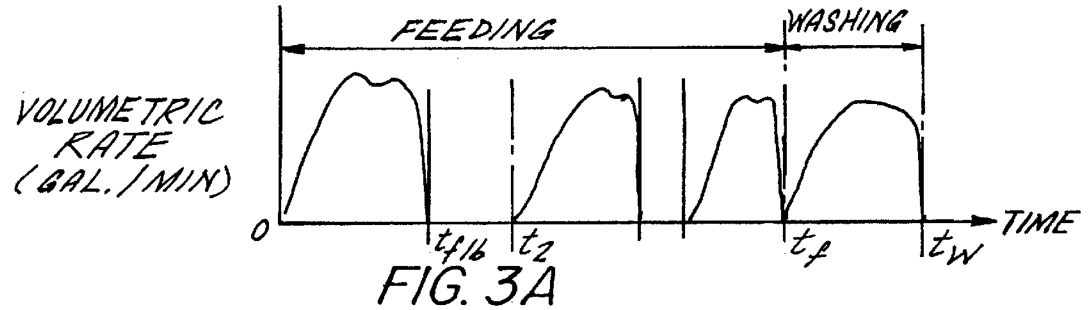
FIGS. 3A–J are plots showing the expected change with time of the on-line (A) volumetric feed rate; (B) mass feed rate; (C) density of feed slurry (or weight fraction of solids); (D) mass of basket contents; (E) pool and cake height; (F) contaminant vs. wash ratio for filtrate and cake; (G) mass of basket contents; (H) the pool and cake depth during dewatering; (I) the percent cake moisture by weight ($W_m$); and (J) the liquid saturation (S).
Figure 3B:
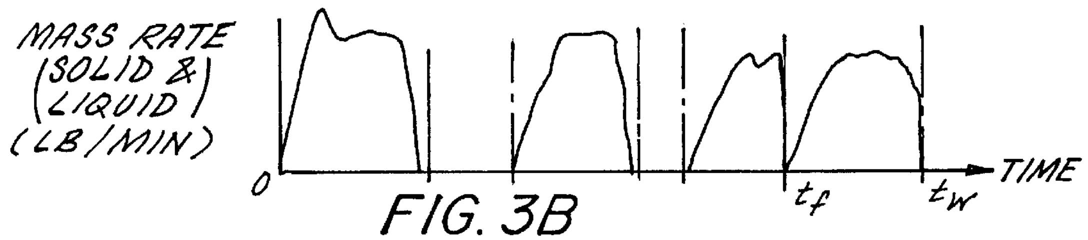
Figure 3C:
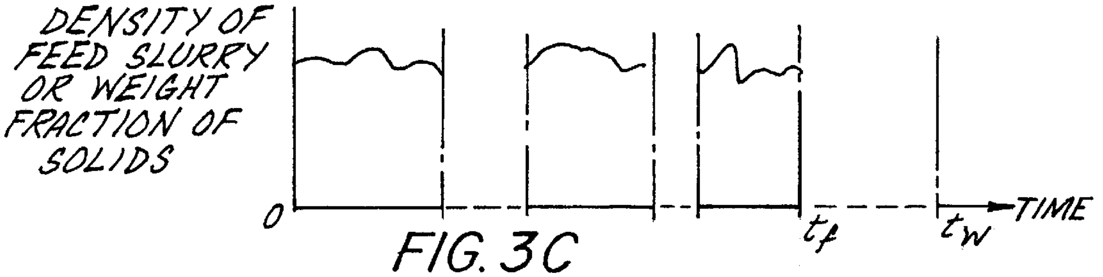
Figure 3D:
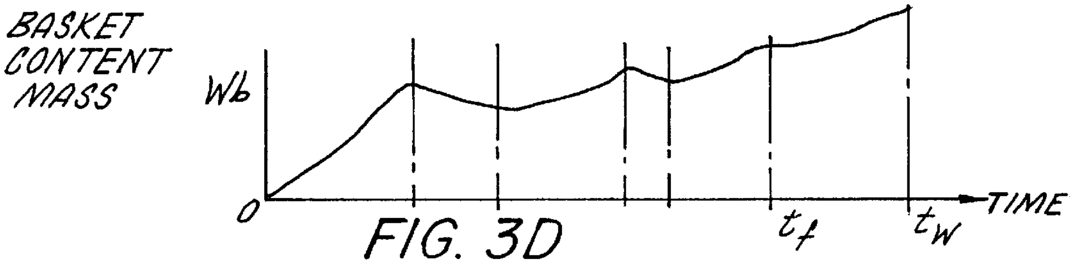
Figure 3E:
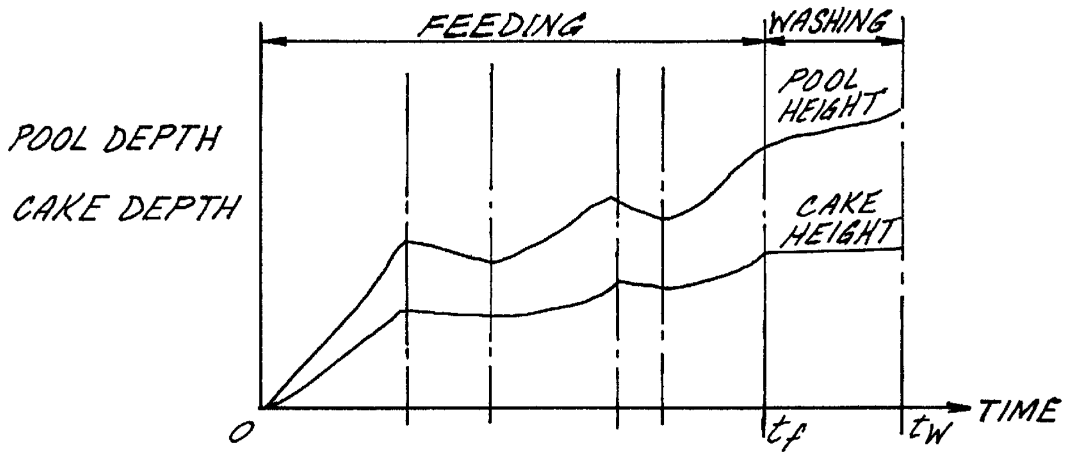

The expected behavior of the on-line volumetric and mass feed rate and solid concentration measurements are shown in FIGS. 3A, B, and C. Concurrently, on-line measurements of the mass of the basket contents (FIG. 3D) and the pool-cake depths (FIG. 3E) may be made. These measurements are also digitized and sent to the CPU.

With the rate and concentration data, the total solid left inside the basket at any given time can be deduced by numerical integration of $$M_{fs}(t) = \int_0 \rho_{slurry}(t)Q(t)W(t)\,dt$$

where:

$M_{fs}(t)$ is the cumulative solids throughput (dry basis) at time t;

$\rho_{slurry}(t)$ is the density of the slurry at time t;

Q(t) is the volumetric rate in gpm (or Lpm) of the feed slurry (solid plus liquid) at time t; and W(t) is the measured solid weight fraction in the slurry at time t.

If the slurry density is not measured, the slurry density may be obtained using the following relationship:

$$\rho_{slurry} = \rho_L + \frac{\rho_L W(\rho_s - \rho_L)}{\rho_L W +_{\rho_s} (1 - W)}$$

where:

$\rho_s$ is the solids density;

$\rho_L$ is the liquids density; and

W is the measured solid weight fraction of the slurry.

The fact that the slurry density is a function of time is due to the change or fluctuation of the weight concentration with time, which is itself due to fluctuation from surge tank drawdown (W(t) change with liquid level due to sedimentation in the surge tank), reactor, crystallizer or upstream separation. For example, it is quite common to have a two- (or more) stage centrifugation process, each stage comprising a crystallizer, surge tank, and basket set, with one stage feeding the next stage.

Figure 3F:
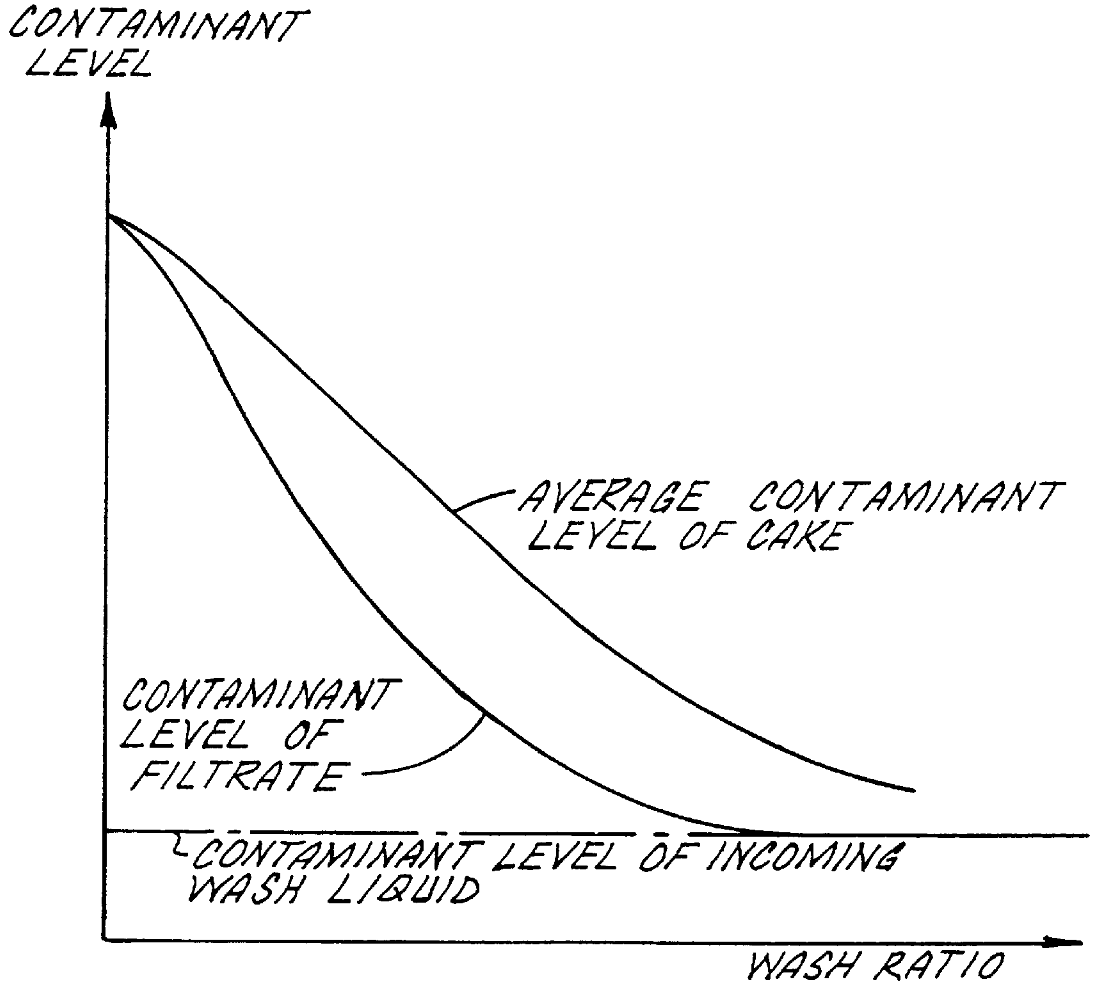
Figure 3G:
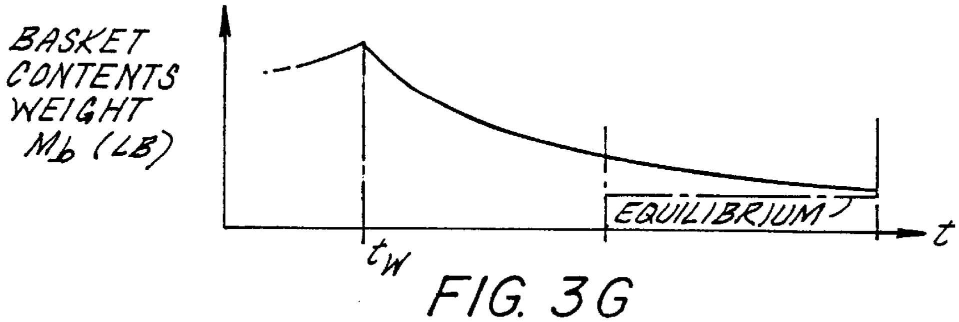

The mass of the basket contents, including both solids and liquids ($M_b$) is measured by the calibrated load cells 210 over a period of time. During the dewatering cycle, the measured mass of the basket contents ($M_b$) exhibits a behavior as illustrated in FIG. 3G. Use of this measurement together with the total solids mass ($M_{fs}$), allow calculation of the cake moisture ($W_m$) by weight fraction averaged over the entire cake during the dewatering cycle using the following relationship:

$$W_m(t) = 1 - \frac{M_{fs}(t)}{M_b(t)}$$

This relationship describes the behavior of cake moisture vs. time on-line as illustrated in FIG. 31. Both the magnitude and the rate of change of cake moisture are monitored as inputs to the controller. If the cake moisture is set at a given level, i.e, by being programmed into the controller, the deduced cake moisture can be compared with the setting. Thus, the dewatering time can be extended if the deduced cake moisture is higher, or the dewatering cycle can be terminated in the event that the deduced moisture is lower compared to the set point. Such control may be exercised automatically, under direction from the controller on a control device, or by an operator. Alternatively, the operator can terminate the dewatering when the rate of change of the cake moisture is less that 0.1% in a given time period.

In a still another embodiment of the present invention, data obtained by sensing the liquid pool depth at a given time, together with the cake height measurement, can yield information on the total filtration resistance of the cake (inversely, cake permeability), cake heel resistance, liquid saturation in the cake, and solids volume fraction of the cake (inversely, cake porosity). Sensing the liquid pool depth at a given time during the feed or wash cycle can be accomplished by means known in the art, for example, radio frequency sensors, i.e., radio frequency reflectance sensors, contact sensors, or conductivity sensors. These data may be used to determine the change in liquid level above the sediment cake having thickness h.

Figure 3H:
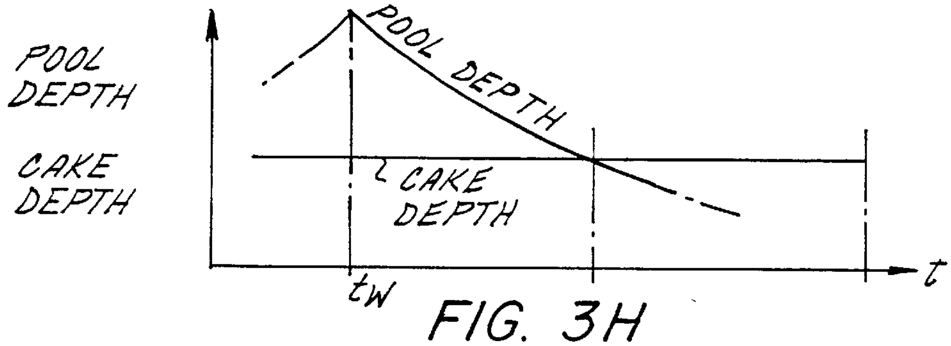

If the cake height is also measured on-line (FIG. 3H), the solids volume fraction ($\epsilon_s$) and the liquid saturation (S) can be determined by first deducing the cake volume from the following relationship $$\begin{aligned} V_{cake} &= \pi(R_b^2 - R_c^2)b \\ &= \pi b[R_b^2 - (R_b - h)^2] \\ &= \pi bh(2R_b - h) \end{aligned}$$

where:

b is the axial length of the basket;

$R_b$ is the radius of the basket;

$R_c$ is the radius to the cake surface; and h is the cake thickness ($R_b$–$R_c$).

The solid volume fraction in the cake ($\epsilon_s$) is the volume of solid occupied per unit volume of the cake. Thus, $\epsilon_s$ may be determined form the aforementioned measurements as follows:

$$\varepsilon_s(t) = \frac{M_{fs}}{\rho_s V_{cake}}$$

The liquid saturation (S) is the volume of liquid occupied per unit void space:

$$S(t) = \frac{M_b - M_{fs}}{\rho_L(1 - \varepsilon_s(t))V_{cake}}$$

Figure 3I:
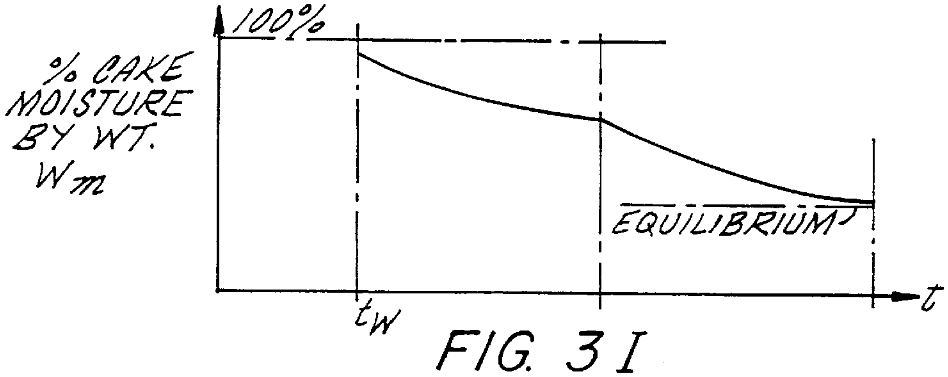
Figure 3J:
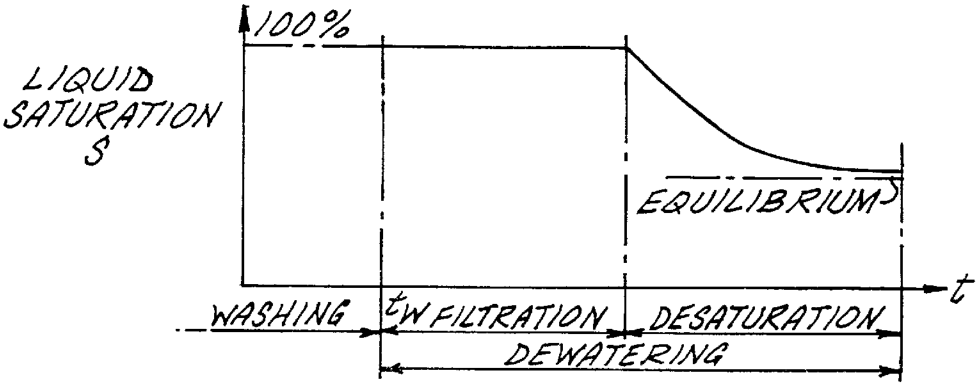

The liquid saturation starts at 100% during the filtration cycle where the cake pores are filled with liquid (see FIG. 3J). The liquid saturation level then starts dropping below 100% as the liquid pool recedes below the cake surface (see FIG. 3H). The liquid saturation continues to drop further until it reaches an equilibrium level, after which it stays constant with time (see FIG. 3J). This equilibrium condition is also demonstrated in FIG. 3I, which illustrates the change in cake moisture by weight over time, and in FIG. 3G, which illustrates the change in the total mass of solids and liquids in the basket over time.

In yet a further embodiment of the present invention, the cake resistance, cake heel resistance, and medium resistance (during the feeding cycle, for example) can be determined as follows. For at least two different cake thicknesses ($h_1$ and $h_2$) measuring the corresponding elapse time ($\Delta t_1$ and $\Delta t_2$) for the liquid surface to transverse from one predetermined radius ($R_{p1}$, measured at t=0) to the next predetermined radius ($R_{p2}$, measured at t=Δt) utilizing the following relationships:

$$\Theta = \frac{\%\ \rho_L \Omega^2\_t}{\ln\left[\frac{R_b^2 - R_{pl}^2}{R_b^2 - R_{p2}^2}\right]} = \frac{\mu}{2\pi K}2.3023\ \log_{10}\left(\frac{R_b}{R_c}\right) + \frac{\mu}{2\pi R_b}r_m$$

$$q = 2\pi R_p\frac{dR_p}{dt} = \frac{\%\ \rho_L \Omega^2 (R_b^2 - R_p^2)}{\frac{\mu}{2\pi K}\ln\left(\frac{R_b}{R_c}\right) + \frac{\mu_{r_m}}{2\pi_{R_b}}}$$

which is derived from the centrifugal filtration equation:

w where:

q is the filtration rate;

μ is the viscosity of the liquid filtrate;

K is the cake permeability;

Ω is the angular rotation speed of the basket;

Θ is the total resistance to filtration (cake plus cake heel/filter medium);

$r_m$ is the flow resistance of the filter medium.

$\Theta_1$ and $\Theta_2$ for respectively $\Delta t_1$ and $\Delta t_2$ corresponding to $h_1$ and $h_2$ can be calculated:

$$\Theta_1 = \frac{\%\ \rho_L \Omega^2\_t_1}{\ln\left[\frac{R_b^2 - R_{pl}^2}{R_b^2 - R_{p2}^2}\right]}$$

$$\Theta_2 = \frac{\%\ \rho_L \Omega^2\_t_2}{\ln\left[\frac{R_b^2 - R_{pl}^2}{R_b^2 - R_{p2}^2}\right]}$$

Figure 4A:
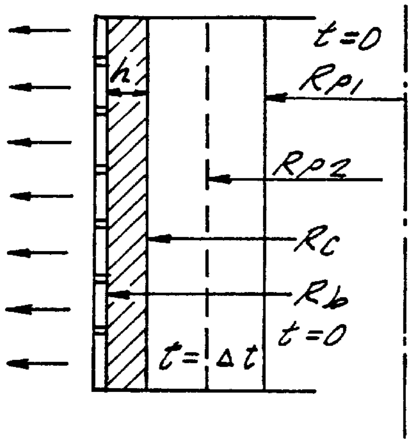
FIG. 4A is a schematic diagram showing h, Δt, $R_{p1}$, $R_{p2}$, $R_c$ and $R_b$.
Figure 4B:
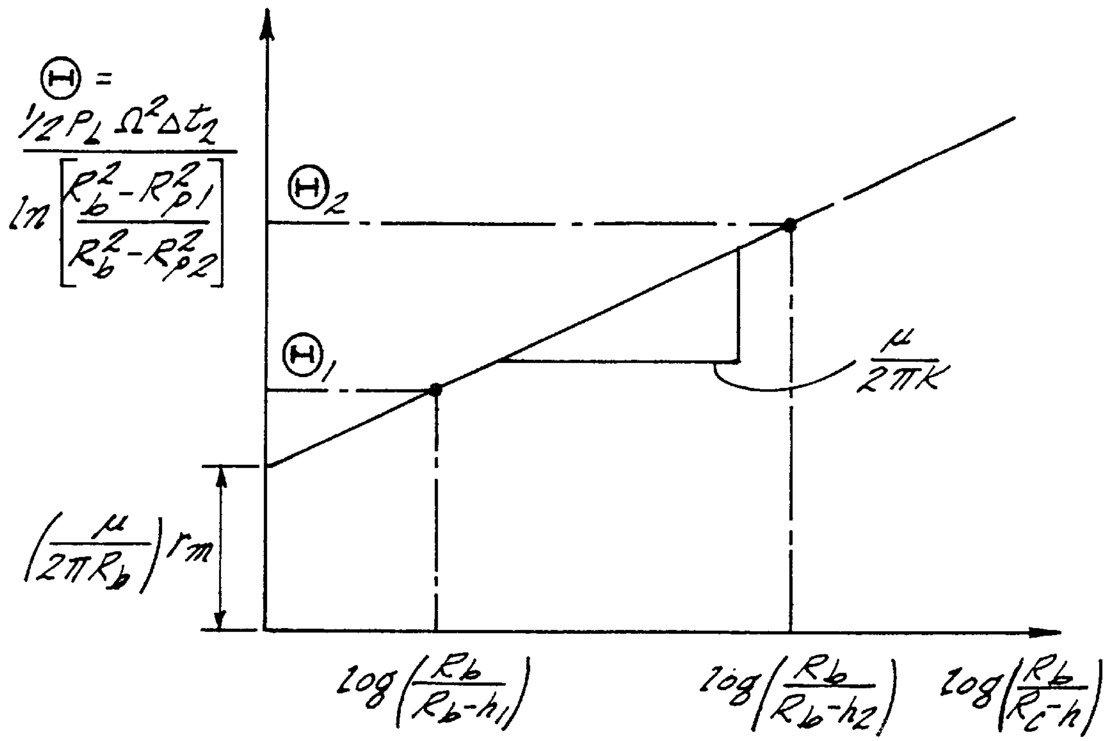
FIG. 4B is a plot showing resistance to filtration (cake+cake height+filter media) vs. different effective cake thicknesses. The slope of the trend yields cake resistance (or inversely cake permeability K) and the y-intercept total cake heel and filter medium resistance.
Figure 5:
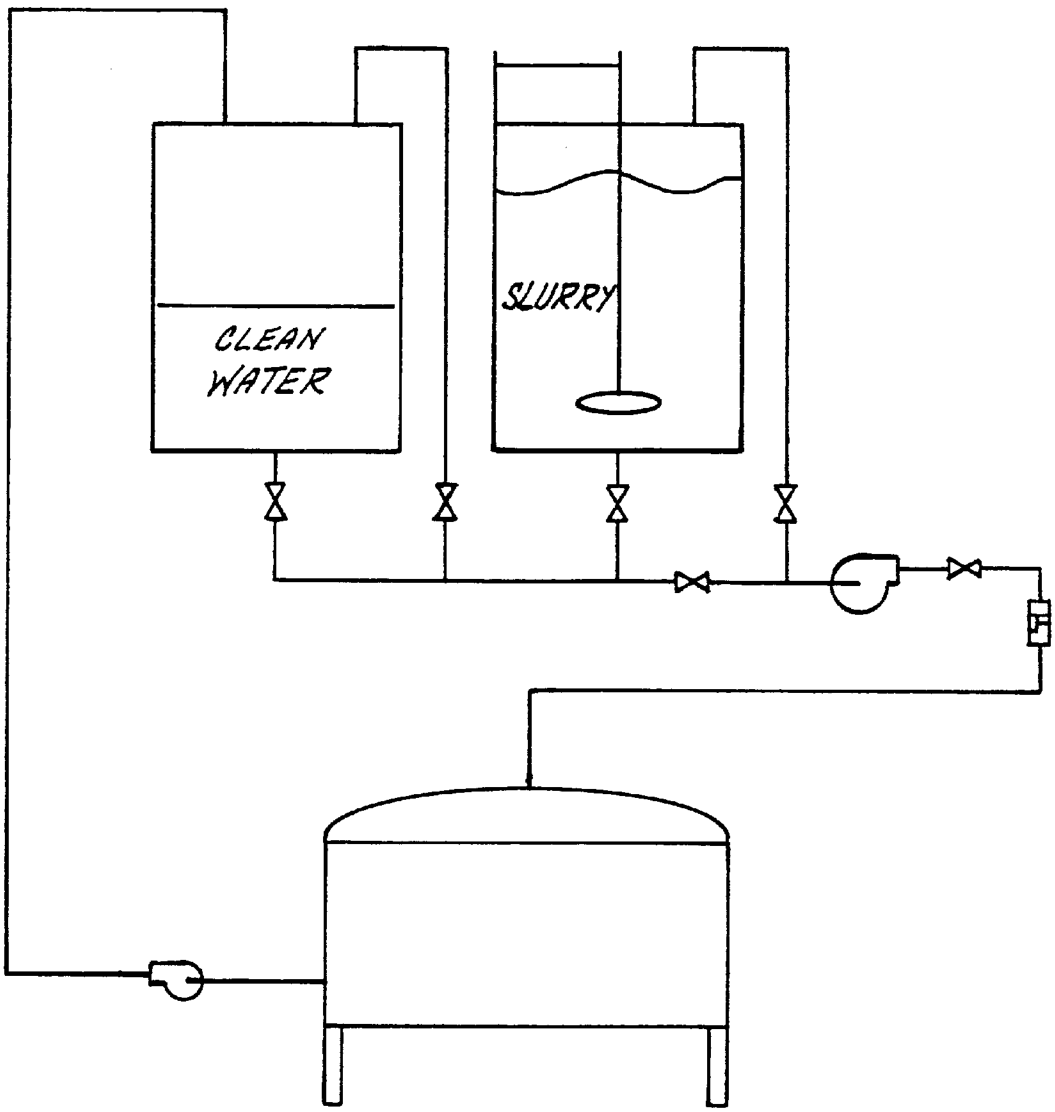
FIG. 5 is a schematic diagram illustrating the setup for demonstrating an intelligent basket centrifuge.

As shown in FIG. 4, a plot of Θ vs. $\log_{10}$ $$\left(\frac{R_b}{R_c}\right)$$

yields a straight line trend through the test data. The cake resistance (inverse of the cake permeability) may be deduced from the slope of the linear trend, and the intercept provides information on the cake heel/filter medium resistance. Measurements of the radii may be made by contact or non-contact methods known in the art, for example sonar or ultrasound imaging, infra-red and ultrasonic reflection, and the like.

If the data indicate that cake resistance is higher than is optimal, the controller can use a control device in the next cycle to increase the feed rate, to lower the solids content of the feed by using a shorter feed time, or add body, filter aid, into the feed, for example. Lowering the solids content results in a smaller cake height and less dewatering time to reach the specified cake moisture. The shorter cycle time at smaller cake depth might be more than offset by having more cycles within the same time frame, thereby resulting in an actual increase in throughput capacity at the same discharged cake moisture. Adding body, also known as filter aid, introduces particles, such as diatomaceous earth which is compatible with the solids, to the feed to provide a more permeable cake structure for filtration. This optimization process is best achieved by a computerized controller as discussed herein.

If the cake heel resistance, as determined from the resistance-cake radii plot, becomes too high a cake heel purge and/or filter medium change should be scheduled in the next cycle to restore filtration rate, before the filtration rate drops off dramatically due to high cake heel/medium resistance. Preferably more than two different cake heights will be tested, yielding a series of data with a linear trend, allowing prediction as to when the purge is needed.

In still another embodiment of the present invention, the levels of cake contaminants are measured, for example by measuring the contaminant exiting with the filtrate. Methods known in the art may be used, for example, using probes sensitive to contaminant level by measuring conductivity or ion content in solution. On-line sampling followed, for example, by gas chromatography-mass spectroscopy (GC-MS) or other analytical analysis may also be used. Given that the filtrate and cake contaminant levels are closely related as shown in FIG. 3F, these measurements can be used to tailor or optimize the amount of wash liquid used to wash the cake (the wash ratio) and/or tailor or to optimize the G-force required during the wash cycle. Another preferred embodiment for controlling the contaminant is to control the wash liquid (rate and sequence), and/or the G-force applied during cake washing, based on the magnitude and rate of change of contaminant in the filtrate. The wash liquid should be applied before the pool subsides below the cake surface to avoid cake cracking.

In a still another embodiment of the present invention, data obtained by sensing torque and amperage can be correlated with the overall basket mass (more properly the moment of inertia which affects the acceleration and deceleration time).

Another embodiment in accordance with the present invention is to control the separation process by passing the feed to a heat exchanger prior to feeding the basket. The reduction in viscosity via temperature adjustments enhances filtration. Hot wash liquid would further provide effective wash as well as facilitating improved dewatering due to viscosity reduction, as a wash liquid at elevated temperature is often used to effectively displace contaminants within the mother liquor. Viscosity may be reduced to one-half and one-third of the value at room temperature at, respectively, 55° C. and 75° C.

Another preferred embodiment wherein a parameter is controlled to optimize the feeding cycle is to feed the machine until the slurry pool reaches a prescribed height, for example about 80–90% of the weir height (as measured by conductivity probe, capacitance probe, ultrasonic, radio frequency, or mechanical arm or the like) and then to "catch up" until the slurry pool drops back to a second prescribed weir height, for example, about 60–75%, after which the sequence repeats itself. Instead of monitoring the pool height, the weight of the basket contents is monitored in real time and control of feeding is based on prior experience in loading the basket for a given slurry, for example, where feeding of the basket is stopped when the weight of the container exceed a given mass, for example 1000 lbs. Alternatively, the feed rate can be trimmed off after the initial period when the slurry pool reaches the predetermined maximum pool of 80–95% of the weir height. The feed rate can be adjusted to the filtration rate so that the driving liquid head and thus the filtration rate stay constantly at maximum. This requires the pool level to remain at the maximum level. The feeding cycle time can thereby be substantially reduced. The cake height is monitored during feeding, for example by the millimeter wave radar, until it reaches the desired thickness.

A preferred method of controlling the cake moisture (conversely dryness) is to adjust basket speed, thus the G-force, cake depth, and dewatering time. These adjustments may be based on the deduced average cake moisture/dryness at any time using the measured mass balance. (The mass balance may be determined from measurements made by strain gauges embedded in the hoops of the basket, which measure the hoop stresses on the basket.) Alternatively, the cake moisture can be measured in situ by directing an infrared beam onto the surface of the cake inside the basket, or onto the cake as the cake is discharged from the basket.

When measuring the moisture of the cake inside the basket, when the cake is wet the infrared beam will be completely absorbed and there will be no reflection of the beam to the pick-up sensor. However, reflection occurs after the cake surface reaches a lower residual moisture level. The infra-red source and pick-up may be fixed at a given axial location, and the moisture measurements made on the rotating cake on the basket represents an average cake moisture around the circumference. Alternatively, the infrared source and pick-up can be mounted on a traveller mechanism which traverses along the axis of the basket, thus allowing the cake moisture distribution to be determined in the entire basket. Diagnosis of potential problems as well as optimization can therefore be made on a finer scale.

For external measurement of the cake moisture as it is discharged, an infrared beam or conductivity probe can be respectively directed at or mounted in the discharged cake. The moisture level of the cake may be deduced from this data. In both cases, this data is fed back to the controller to adjust the dewatering time for the subsequent batches. Other than the non-intrusive testings, local cake moisture measurement using intrusive sensors such as electrical conductivity probes can also be adopted as appropriate.

Another particularly preferred embodiment is where the basket is "overfed", causing the supernatant of the rapidly settled slurry to overflow the weir which contains the annular pool. This supernatant overflow is then returned to the feed tank upstream. The suspended solids concentration in the supernatant overflow is monitored, for example by a density meter, to ensure that the solids concentration is significantly below that of the feed. Where the suspended solids concentration in the overflow is too high, the rate of the feed must be reduced, or the feed must be diluted.

In another embodiment of the present invention, the actual internal separation taking place with cake formation can be shown by an imaging sensor, e.g., shown visually by a camera, millimeter wave radar imaging, or the equivalent.

In another embodiment, the vibration of the basket is monitored, especially during feeding, where machine imbalance might result from uneven distribution of the feed in the basket both circumferentially and longitudinally. This dictates the suspended feed solids concentration (too concentrated a feed tends to have higher vibration as the G-force can not effectively redistribute the solids in the basket) and feeding sequence as well as the amount of feed solid in each charge during the feeding cycle. Excess liquid pool also helps to smooth any non-uniform cake height profile under G-force, thereby reducing possible imbalance and vibration.

In another embodiment of the present invention, the feed slurry may be adjusted, typically by dilution, to reduce hindered settling which results in slow cake formation. Therefore, hindered settling may be detected by monitoring the cake height over time.

A further embodiment, in accordance with the present invention, controls the nominal solids throughput rate by optimizing the batch cycle time and the solids mass per batch. For example, it may be possible to filter a given mass for a given period, for example five pounds in ten minutes. Through trials, it may also be possible to filter a lesser amount of the same feed input, for example two and a half pounds in a lesser amount of time, for example three minutes. Running three cycles under these latter conditions would result in the filtration of seven and one-half pounds in nine minutes, a higher rate than five pounds in ten minutes. The highest throughput rate is therefore obtained by filtering smaller batches for shorter cycle time. The highest throughput rate depends on the filtration, washing, and dewatering characteristics of the input feed. Trial and analysis of these variables is best adapted using computerized intelligence for determining the optimal operating condition according to the feed condition and set goal for separation, both of which may change with time. The same approach may be used to attain optimal cake moisture and optimal cake purity.

The following non-limiting examples illustrate several specific parameters which may be sensed and controlled by the computerized control system of the present invention.

EXAMPLES

Apparatus and Procedures for Dewatering Tests

The intelligent vertical centrifuge in accordance with the present invention is equipped with load cells from which the mass of the basket contents can be determined in real time. This data is provided to a computer and with the methodology discussed, it is translated to cake moisture; information which is available on-line. The basket operation is controlled through manipulation of the various segments of acceleration, feeding, washing, dewatering, and unloading, all of which are programmed on an interactive basis. The basket is further equipped with air blow-back from the basket outer radius to discharge the cake heel. A set of air jets at the two comers of the blade edge (in contact with the cake) of the unloader knife further facilitates the removal of cake heel. The basket is also equipped with ample wash nozzles to provide "clean-in-place" and "sanitary-in-place" capabilities with minimal-to-no solids trapped within the basket. This is an important requirement for pharmaceutical and specialty chemicals processing, where the value of solid is high and loss of solid or contamination from the previous batch of different products cannot be tolerated. The basket is also equipped with higher G-force for machines with comparable size. For a 60" diameter basket, the maximum G is 1000 g and for a smaller 38" basket, the G-force reaches 1500 g.

During operation, the number of bags of slurry and quantity of water added to form the slurry are carefully recorded. The centrifuge is accelerated to the desired G-level of cake formation. A fixed amount of well-mixed slurry is then metered into the centrifuge, as measured by the flowmeter, to yield the desired cake height. The feed time is monitored using a stop-watch. Once the designated amount of slurry has been added, the feed valve is shut, the pump is turned off, and the slurry tank valve is closed. The feed time and the total mass of the basket contents are recorded.

Once the cake has reached a point where it no longer deforms upon stopping the centrifuge, the total mass of the basket contents are recorded. The centrifuge is stopped, and the mass of the final basket contents after deceleration, along with the deceleration time are recorded. The axial cake height is measured and recorded axially at the top, middle and bottom of the basket. In addition, samples are taken using containers from each of these locations. The samples and containers are subsequently a weighed and dried in an oven overnight. The dry sample weights are determined, and the moisture of the cake calculated.

After measuring the cake heights and taking the samples, the centrifuge is spun up to high speed (1080 rpm) to fully dewater the cake. The dry cake is finally discharged using the computer-driven control features of the centrifuge, including the plow to remove the bulk of the cake, and the back-blow and air knife to remove the cake heel. After the discharge cycle, the cloth is inspected for any tears and residual cake heel.

Results of Dewatering Tests

Figure 6:
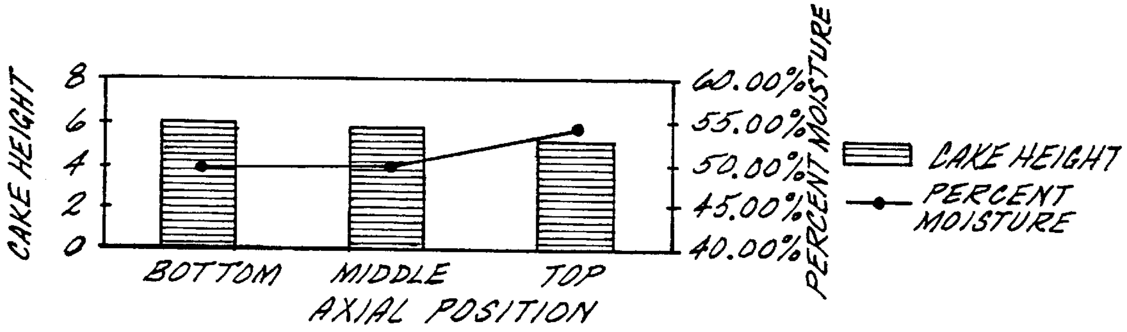
FIG. 6 is a plot of experimental data showing the percent cake moisture and cake height respectively at the bottom, middle, and top (basket top) axial positions for a median 16.4-$\mu$m particle size diamaceteous earth cake dewatered at 350 g in 365 seconds. The cake height increases marginally from bottom to top while the cake moisture stays constant at the middle and bottom position along the basket and increases toward the top of the basket.
Figure 7:
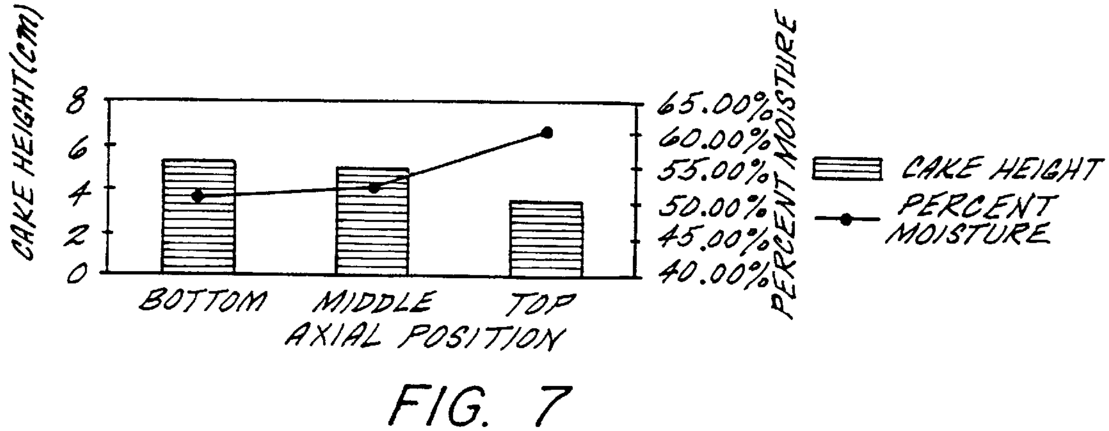
FIG. 7 is a plot showing percent cake moisture and cake height respectively at the bottom, middle, and top axial positions for a 28.6-$\mu$m median particle size diamaceteous earth cake dewatered at 200 g in 278 seconds.
Figure 8:
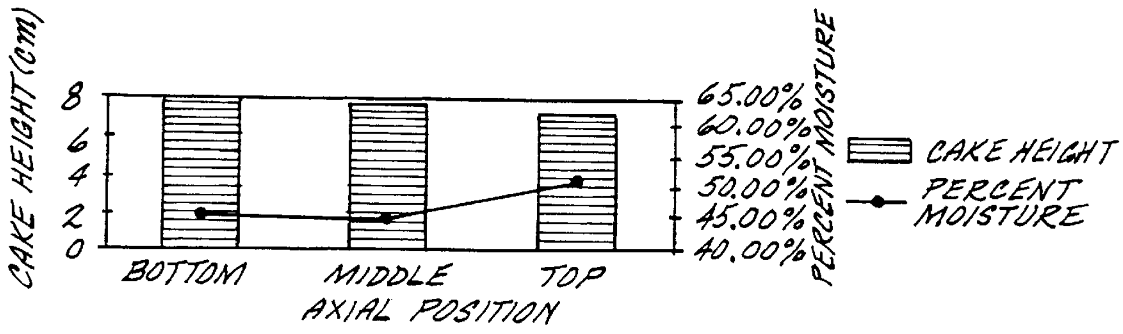
FIG. 8 is a plot showing percent cake moisture and cake height respectively at the bottom, middle, and top axial positions for a 55-$\mu$m median particle size diamaceteous earth cake dewatered at 200 g in 139 seconds.

FIGS. 6, 7, and 8 show plots of the cake moisture and cake height as a function of axial position at representative G-levels, and the dewatering times for each of three DE (diatomaceous earth) cake materials. DE, which is derived from seaweed, is commonly used to enhance cake filtration. These plots indicate the axial moisture distribution and the axial cake geometry. For the 16.4 and 28.6 $\mu$m median particle size DE materials, the cake moisture increases while the cake height decreases towards the top, as shown in FIGS. 6 and 7. For the 55-$\mu$m median particle size DE, FIG. 8 also shows similar trends. However, the minimum moisture is observed in the middle, whereas for the smaller median particle size DE materials, the minimum moisture is observed at the bottom.

Figure 9:
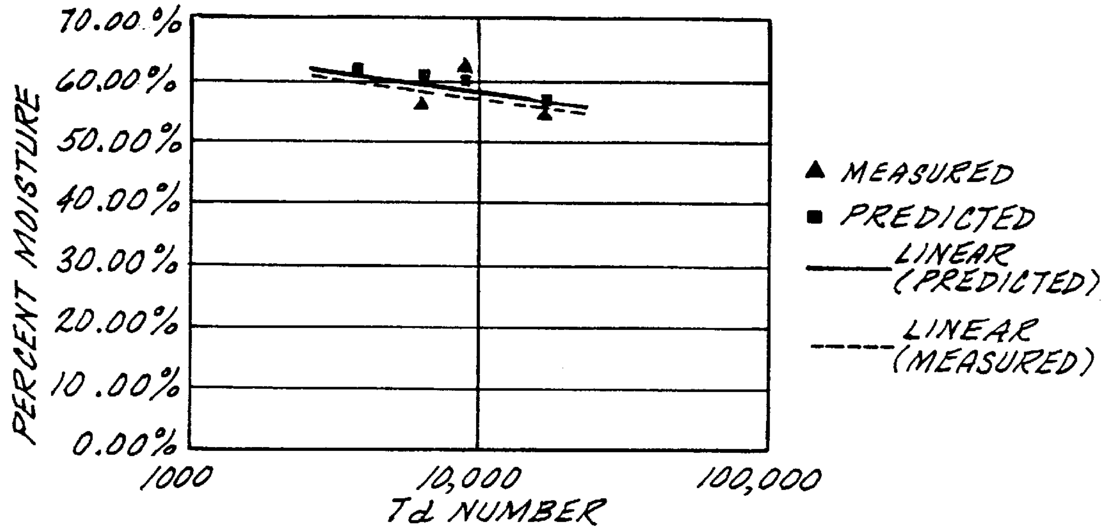
FIG. 9 is a plot showing the influence of Td number on percent cake moisture for 16.4-$\mu$m median particle size diamaceteous earth cake dewatered using the advanced centrifuge in accordance with the present invention.
Figure 10:
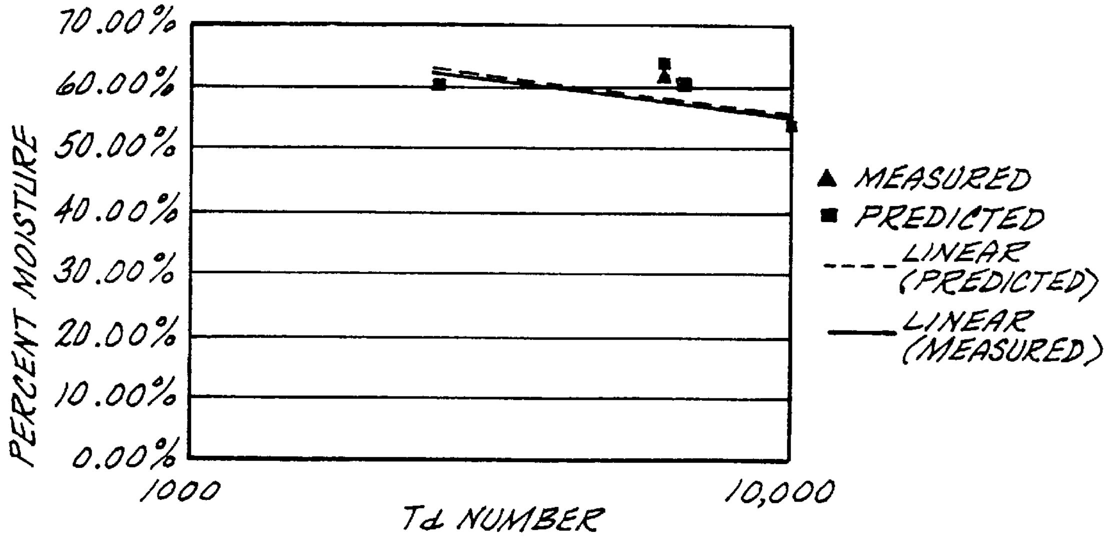
FIG. 10 is a plot showing the influence of Td number on percent cake moisture for 28.6-$\mu$m median particle size DE cake dewatered using the intelligent centrifuge in accordance with the present invention.

The measured moisture at the middle of each cake is selected as representative of the cake, and plotted against the dimensionless dewatering parameter Td for two test materials in FIGS. 9 and 10. Note that Td is proportional to the variables regrouped in the form of G-seconds/cake height. The predicted cake moisture, using a macroscopic mass balance as discussed in the theory section, is also plotted alongside the measured moisture. The agreement between the measured values and predicted values is quite good for 16.4-$\mu$m median particle size DE, and excellent for 28.6-$\mu$m median particle size DE, as shown in FIGS. 9 and 10.

For 16.4-$\mu$m median particle size DE, the data suggest percent moisture increases with both increasing Td number and increasing G-seconds/cake height, as shown in FIG. 9. For the 28.6-$\mu$m median particle size DE materials, linear trendlines suggest that the percent moisture decreases with increasing Td number or thus increasing G-seconds/cake height as shown in FIG. 10.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for controlling a batch-feed basket centrifuge having a rotatable perforated basket, comprising:

measuring cake height distribution in the basket centrifuge with respect to time; and controlling the basket centrifuge, at least in part, in response to the measured cake height.

2. The method of claim 1 including:

measuring pool level with respect to time and also using such pool level measurement to control the basket centrifuge.

3. The method of claim 2 including:

calculating cake volume from the measured pool depth and cake height;

adjusting centrifuge operation based on the cake volume.

4. The method of claim 2 wherein pool level is measured using at least one of radar reflection, ultrasonic wave reflection and proximity probes.

5. The method of claim 2 wherein the cake height and pool level are simultaneously measured using pressure transducers.

6. The method of claim 5 wherein:

the pressure transducers are positioned at spaced locations along at least one of the bowl head and weir plate.

7. The method of claim 2 wherein the pool level is measured using an energy source targeted at the pool wherein energy beamed from said source is reflected back from both the pool surface and the pool/cake interface, the two reflected beams being compared whereby pool level is derived.

8. The method of claim 7 wherein cake height is derived from pool depth to cake, pool surface location and basket radius.

9. The method of claim 2 wherein the basket centrifuge is controlled by adjusting at least one of (a) feed rate and duration of feed, (2) feed solids concentration and (3) speed of basket.

10. The method of claim 1 wherein the cake height is measured using at least one of the mass of the basket contents and bulk cake density.

11. The method of claim 10 wherein the mass of the basket contents is obtained from a load cell.

12. The method of claim 10 wherein pool level is measured using at least one of radar reflection, ultrasonic wave reflection and proximity probes.

13. The method of claim 1 wherein the basket centrifuge is controlled by adjusting at least one of (a) feed rate and duration of feed, (2) feed solids concentration and (3) speed of basket.

14. The method of claim 1 wherein cake height is measured by monitoring filtration rate.

15. The method of claim 1 wherein cake height is measured by monitoring the solids content of the filtrate.

16. The method of claim 1 wherein cake height is measured by monitoring at least one of the torque, power and amperage required to rotate the basket and correlating the monitored torque, power and amperage with inertia thereby determining mass.

17. The method of claim 1 wherein cake height is measured by monitoring the vibration level of the centrifuge.

18. The method in accordance with claim 1, wherein controlling the basket centrifuge also includes:

a CPU controller which monitors, compares, and adjusts at least one operating parameter of the centrifuge based on an internal process model.

19. The method in accordance with claim 18 wherein:

said process model is at least partially generated and updated by means of at least one analysis method selected from the group consisting of analytical models on cake filtration and dewatering, neural networks, genetic algorithms, fuzzy logic, expert systems, statistical analysis, signal processing, pattern recognition, categorical analysis, and combinations thereof.

20. The method in accordance with claim 18, wherein:

said process model is further generated and updated by at least one of feed forward loops, feedback loops, or feed forward or feedback loops incorporating at least one of proportional, integral, or differential controls.

21. The method in accordance with claim 18, wherein:

said process model is further generated from at least one of the group consisting of pre-programmed or site-programmed instructions and operating sequences.

22. A method for controlling a batch-feed basket centrifuge having a rotatable perforated basket, comprising:

measuring liquid pool depth and cake height distribution;

calculating cake volume; and adjusting centrifuge operation based on at least one of the liquid pool depth, the cake height or the cake volume.

23. The method in accordance with claim 22, further comprising:

calculating cake solid volume fraction;

comparing the calculated cake solid volume fraction with a preselected value; and terminating a dewatering cycle when the calculated value meets or is less than the predetermined value.

24. The method in accordance with claim 22, further comprising:

calculating cake liquid saturation level;

comparing the calculated cake liquid saturation level with a preselected value; and terminating a dewatering cycle when the calculated value meets or is less than the predetermined value.

25. The method in accordance with claim 22, wherein the liquid pool depth is measured by one or more of the group consisting of ultrasonic sensor, radio frequency reflectance sensor, video camera, contact sensor, conductivity sensor, capacitance level probe, and combinations thereof.

26. The method in accordance with claim 22, wherein the cake height is measured by one or more of the group consisting of ultrasonic sensor, sonar sensor, a mechanical arm proximity measurement, radio frequency, and combinations thereof.

27. A method for controlling a batch-feed basket centrifuge having a rotatable perforated basket, said basket having end walls, a pool surface and a filter medium, comprising:

measuring cake height;

measuring transverse time required for the pool surface to transverse from one measured radius to a second measured radius;

calculating filtration rate;

calculating cake heel/filter medium resistance to filtration; and adjusting centrifuge operation based on at least one of the cake height, transverse time, filtration rate, or cake heel/filter medium resistance.

28. The method in accordance with claim 27 wherein at least one of the calculated values is compared with at least one predetermined value; and controlling one or more centrifuge operations selected from the group consisting of lowering input stream solids content, adding filter aid, decreasing feed cycle length, cleaning the filter medium, replacing the filter medium, and combinations thereof, when the calculated value exceeds the predetermined value.

29. The method in accordance with claim 27, wherein the cake height is measured by ultrasonic sensor, sonar sensor, radio frequency, mechanical arm, and combinations thereof.

30. The method in accordance with claim 27, wherein the transverse time is measured by pressure transducers embedded in the end walls of the basket, conductivity probe, ultrasound imaging, video imaging, and combinations thereof.

31. A method for controlling a batch-feed basket centrifuge having a rotatable perforated basket, comprising:

measuring cake contaminant level;

comparing the cake contaminant level with a predetermined level; and adjusting wash cycle length, wash ratio, wash sequence, wash rate, wash temperature, basket speed during the wash cycle and subsequent dewatering cycle, and combinations thereof.

32. The method of claim 31, wherein the cake contaminant level is measured by monitoring feed concentration and filtrate contaminant level.

33. A batch-feed basket centrifuge having a rotatable perforated basket and a pool surface, comprising:

at least one non-contact measurement device selected from the group consisting of capacitance level probe, ultrasound sensor, radio frequency sensor, reflectance sensor and video camera for measuring pool height or time required for the pool surface to transverse from one measured radius to a second measured radius.

34. A method for controlling a batch-feed basket centrifuge having a rotatable perforated basket, comprising:

monitoring vibration of the basket during feeding;

comparing the vibration with a predetermined maximum value; and diluting feed solids, adjusting feed rate, changing feed pipe geometry, feed distribution, feed location, rotation speed or centrifugal force, or a combination thereof, when the vibration meets or exceeds the value.

* * * * *

UNITED STATES PATENT AND TRADEMARK OFFICE

CERTIFICATE OF CORRECTION

PATENT NO. : 6,328,897 B1
DATED : December 11, 2001
INVENTOR(S) : Wallace Woon-Fong Leung It is certified that error appears in the above-identified patent and that said Letters Patent is hereby corrected as shown below:

<u>Column 1</u>,
Line 57, after "FIG." delete "IA" and insert therefor -- 1A --.

<u>Column 7</u>,
Line 53, after "5,948,271" insert therefor -- , --.

<u>Column 11</u>,
Line 52, after "in FIG." delete "31" and insert therefor -- 3I --.

<u>Column 12</u>,
Line 33, after "determined" delete "form" and insert therefor -- from --.

<u>Column 13</u>,
Lines 5, 7, 25 and 30, in formula, delete "%" and insert therefor -- ½ --; and
Lines 5, 25 and 30, in formula, delete "_" and insert therefor -- Δ --.

<u>Column 16</u>,
Line 31, after "at the two" delete "comers" and insert therefor -- corners --.

<u>Column 18</u>,
Line 60, after "of the" delete "group" and insert therefor -- groups --.

Signed and Sealed this

Twenty-second Day of November, 2005

JON W. DUDAS
*Director of the United States Patent and Trademark Office*